United States Patent
Kim et al.

(10) Patent No.: US 11,063,641 B2
(45) Date of Patent: *Jul. 13, 2021

(54) APPARATUS AND METHOD FOR TRANSMITTING AND RECEIVING PHASE COMPENSATION REFERENCE SIGNAL

(71) Applicant: Samsung Electronics Co., Ltd., Suwon-si (KR)

(72) Inventors: Jaewon Kim, Seoul (KR); Jeehwan Noh, Suwon-si (KR); Hyunseok Ryu, Yongin-si (KR); Hyukmin Son, Hanam-si (KR); Hyunkyu Yu, Suwon-si (KR); Hyunil Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/905,184

(22) Filed: Jun. 18, 2020

(65) Prior Publication Data

US 2020/0322010 A1 Oct. 8, 2020

Related U.S. Application Data

(63) Continuation of application No. 16/560,412, filed on Sep. 4, 2019, now Pat. No. 10,693,536, which is a (Continued)

(30) Foreign Application Priority Data

Jul. 18, 2017 (KR) .................. 10-2017-0091042

(51) Int. Cl.
*H04B 7/0456* (2017.01)
*H04L 5/00* (2006.01)
(Continued)

(52) U.S. Cl.
CPC ......... *H04B 7/0456* (2013.01); *H04L 5/0048* (2013.01); *H04L 25/0204* (2013.01); *H04L 25/0224* (2013.01); *H04W 72/042* (2013.01)

(58) Field of Classification Search
CPC ....... H04W 4/80; H04W 84/18; H04W 88/06; H04W 12/04; H04W 52/244;
(Continued)

(56) References Cited

U.S. PATENT DOCUMENTS 10,693,536 B2 * 6/2020 Kim .................. H04L 25/0204
2009/0125793 A1 5/2009 Kishigami et al.
(Continued)

FOREIGN PATENT DOCUMENTS

| CN | 104980197 A | 10/2015 |
| WO | 2016/080051 A1 | 5/2016 |
| WO | 2017/196896 A1 | 11/2017 |

OTHER PUBLICATIONS

Nokia et al., "Discussion on PT-RS design for CP-OFDM", 3GPP Draft; R1-1711308, 3rd Generation Partnership Project (3GPP), Mobile Competence Centre; 650, Route Des Lucioles; F-06921 Sophia-Antipolis Cedex; France, vol. RAN WG1, Qingdao, P.R. China, Jun. 27, 2017-Jun. 30, 2017, Jun. 16, 2017, XP051304618.
(Continued)

*Primary Examiner* — Nimesh Patel
(74) *Attorney, Agent, or Firm* — Jefferson IP Law, LLP

(57) ABSTRACT

A method and system for converging a 5th-generation (5G) communication system for supporting higher data rates beyond a 4th-generation (4G) system with a technology for Internet of Things (IoT) are provided. The present disclosure may be applied to intelligent services based on the 5G communication technology and the IoT-related technology, such as smart home, smart building, smart city, smart car, connected car, health care, digital education, smart retail,
(Continued)

security and safety services. The method for transmitting and receiving a phase compensation reference signal (PCRS) to compensate for phase noise. The method may determine whether a first precoding is applied to a demodulation reference signal (DMRS) and the PCRS to be transmitted to a terminal. The base station may also generate the DMRS and the PCRS, based on whether the first precoding is applied to the DMRS and the PCRS, and transmit data, the DMRS, and the PCRS to the terminal.

8 Claims, 26 Drawing Sheets

Related U.S. Application Data continuation of application No. 15/669,330, filed on Aug. 4, 2017, now Pat. No. 10,419,087.

(60) Provisional application No. 62/371,467, filed on Aug. 5, 2016.

(51) Int. Cl.
  *H04L 25/02* (2006.01)
  *H04W 72/04* (2009.01)

(58) Field of Classification Search
  CPC . H04W 72/042; H04W 52/24; H04W 52/325; H04W 72/0406; H04W 72/0453; H04W 72/0473; H04W 72/08; H04W 52/225; H04W 52/246; H04W 4/08; H04W 72/085; H04W 72/0413; H04W 16/28; H04W 52/242; H04W 28/06; H04W 52/42; H04W 56/0045; H04W 72/082; H04W 72/1231; H04W 16/10; H04W 72/04; H04W 72/0446; H04W 72/046; H04W 72/12; H04W 24/10; H04W 24/08; H04W 72/1284; H04W 72/1289; H04W 72/14; H04W 16/14; H04W 28/18; H04W 52/146; H04W 72/1205; H04W 72/1242; H04W 76/11; H04W 88/02; H04W 88/08; H04W 88/10; H04W 48/20; H04W 72/044; H04W 72/0466; H04W 72/10; H04W 74/006; H04L 27/18; H04L 5/0037; H04L 5/005; H04L 5/0094; H04L 37/0619; H04L 27/2647; H04L 1/0002; H04L 1/0019; H04L 1/20; H04L 25/0202; H04L 25/0222; H04L 1/0618; H04L 25/0204; H04L 5/0035; H04L 5/0053; H04L 5/0023; H04L 2025/03802; H04L 27/2601; H04L 63/0807; H04L 5/00; H04L 5/0048; H04L 12/16; H04L 12/66; H04L 5/0007; H04L 63/061; H04L 63/065; H04L 25/0224; H04L 27/0014; H04L 1/0026; H04L 27/2602; H04L 25/03343; H04L 2025/03414; H04L 5/001; H04L 5/0057; H04L 5/0092; H04L 27/2657; H04L 1/1812; H04L 1/003; H04L 1/004; H04L 5/0091; H04L 1/0003; H04L 1/0004; H04L 1/001; H04L 25/03159; H04L 25/03866; H04L 27/2695; H04L 5/0042; H04L 5/0055; H04L 5/0058; H04L 5/006; H04L 5/0098; H04B 7/2656; H04B 7/0456; H04B 7/0697; H04B 7/0413; H04B 7/0452; H04B 7/0617; H04B 7/0671; H04B 7/0689; H04B 17/24; H04B 17/318; H04B 1/126; H04B 7/0632; H04B 7/0891; H04B 7/024; H04B 7/0626; H04B 7/0639; H04B 10/5051; H04B 7/0634; H04B 7/026; H04B 7/0615; H04B 7/068; H04B 7/0695; H04B 7/04; H04B 7/0619; H04B 7/0814; H04B 17/345; H04B 17/373; H04J 11/0033; H04J 11/00; H04J 11/0023; H04J 14/08; H04J 11/005; H04J 11/0069; H04J 13/0003; H04J 13/12; H04J 2013/0096; H04M 11/062; H04M 11/06; H04M 3/18; H04M 3/306
  See application file for complete search history.

(56) References Cited

U.S. PATENT DOCUMENTS

| | | |
|---|---|---|
| 2010/0080154 A1 | 4/2010 | Noh et al. |
| 2010/0183085 A1 | 7/2010 | Taoka et al. |
| 2012/0329503 A1 | 12/2012 | Jongren et al. |
| 2013/0121276 A1 | 5/2013 | Kim et al. |
| 2014/0050259 A1 | 2/2014 | Azizi et al. |
| 2014/0167989 A1 | 6/2014 | Goes et al. |
| 2014/0247778 A1 | 9/2014 | Gomadam |
| 2014/0342746 A1 | 11/2014 | Nakashima et al. |
| 2015/0245368 A1 | 8/2015 | Nukala et al. |
| 2017/0026100 A1 | 1/2017 | Wang et al. |
| 2017/0272134 A1 | 9/2017 | Yuan et al. |
| 2017/0279561 A1 | 9/2017 | Nakamura et al. |
| 2017/0339713 A1 | 11/2017 | Kimura et al. |
| 2018/0014254 A1 | 1/2018 | Hwang et al. |
| 2018/0077603 A1 | 3/2018 | Wilson et al. |

OTHER PUBLICATIONS

Panasonic, "PT-RS port association and indication", 3GPP Draft; R1-1705160_PTRS_PortAssociation_Indication, Generation Partnership Project (3GPP), Mobile Competence Centre; 650, Route Des Lucioles; F-06921 Sophia-Antipolis Cedex; France, vol. RAN WG1, Spokane, US, Apr. 3, 2017-Apr. 7, 2017, Mar. 24, 2017, XP051250602.
European Office Action dated Aug. 3, 2020, issued in European Patent Application No. 17837293.4.
Verizon, "Verizon 5G TF; Air Interface Working Group; Verizon 5th Generation Radio Access; Physical layer procedures (Release 1)", TS V5G.213 v1.0, Jun. 2016.
Verizon, "Verizon 5G TF; Air Interface Working Group; Verizon 5th Generation Radio Access; Physical layer procedures (Release 1)", TS V5G.213 v1.3, Jun. 2016.
Extended European Search Report dated Dec. 12, 2019, issued in European Patent Application No. 17837293.4.
Verizon, "Verizon 5G TF; Air Interface Working Group; Verizon 5th Generation Radio Access; Physical channels and modulation (Release 1)", TS V5G.211 V1.3 (Jun. 2016), Jun. 30, 2016.
Chinese Office Action dated May 6, 2021, issued in Chinese Patent Application No. 201780048267.X.

\* cited by examiner

APPARATUS AND METHOD FOR TRANSMITTING AND RECEIVING PHASE COMPENSATION REFERENCE SIGNAL

CROSS-REFERENCE TO RELATED APPLICATION(S)

This application is a continuation application of prior application Ser. No. 16/560,412, filed on Sep. 4, 2019, which is a continuation application of prior application Ser. No. 15/669,330, filed on Aug. 4, 2017, which has issued as U.S. Pat. No. 10,419,087 on Sep. 17, 2019 and was based on and claimed priority under 35 U.S.C. § 119(e) of a U.S. Provisional application Ser. No. 62/371,467, filed on Aug. 5, 2016, in the U.S. Patent and Trademark Office, and under 35 U.S.C. § 119(a) of a Korean patent application number 10-2017-0091042, filed on Jul. 18, 2017, in the Korean Intellectual Property Office, the disclosure of each of which is incorporated by reference herein in its entirety.

TECHNICAL FIELD

The present disclosure relates to an apparatus and method for transmitting and receiving a reference signal. More particularly, the present disclosure relates to an apparatus and method for transmitting and receiving a phase compensation reference signal.

BACKGROUND

Because demand for wireless data traffic has been increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as devices, exchange and process information without human intervention. The Internet of Everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine Type communication (MTC), and so forth have been recently researched. Such an IoT environment may provide intelligent Internet technology services that create a new value to human life by collecting and analyzing data generated among connected devices. IoT may be applied to a variety of fields including a smart home, a smart building, a smart city, a smart car or connected cars, a smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

The 5G communication system is expected to use a high frequency band.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a new reference signal to compensate for signal attenuation due to phase error. The disclosure also provide a method for efficiently transmitting a phase compensation reference signal for compensating for a phase noise. More particularly, the present disclosure provides a method for a base station to generate and transmit a phase compensation reference signal (PCRS) depending on whether the same precoding as a demodulation reference signal (DMRS) is applied, and for a terminal to estimate channel information by receiving the PCRS.

In accordance with an aspect of the present disclosure, a method of a base station in a communication system is provided. The method includes determining whether a first precoding is applied to a demodulation reference signal (DMRS) and a phase compensation reference signal (PCRS) to be transmitted to a terminal, generating the DMRS and the PCRS based on whether the first precoding is applied to the DMRS and the PCRS, and transmitting data, the DMRS, and the PCRS to the terminal.

Additionally, the method of the base station may further comprise transmitting, to the terminal, downlink control information including antenna information indicating at least one antenna port associated with the DMRS and at least one antenna port associated with the PCRS and precoding information indicating whether the first precoding is applied. In the method, the precoding information indicates that the first precoding is applied to the at least one antenna port associated with the DMRS and the at least one antenna port associated with the PCRS. The DMRS may be used to estimate channel information, and the PCRS may be used to estimate a phase noise and to compensate the channel information.

In accordance with an aspect of the present disclosure, a method of a terminal in a communication system is provided. The method includes receiving data, a DMRS, and a PCRS from a base station, determining whether a first precoding is applied to the DMRS and the PCRS, and estimating channel information using the DMRS and the PCRS based on whether is the first precoding is applied to the DMRS and the PCRS.

In accordance with an aspect of the present disclosure, a base station in a communication system comprises a transceiver configured to transmit and receive a signal, and a controller configured to determine whether a first precoding is applied to a DMRS and a PCRS to be transmitted to a terminal, generate the DMRS and the PCRS based on whether the first precoding is applied to the DMRS and the PCRS, and transmit data, the DMRS, and the PCRS to the terminal.

In accordance with an aspect of the present disclosure, a terminal in a communication system comprises a transceiver configured to transmit and receive a signal, and a controller configured to receive data, a DMRS, and a PCRS from a base station, determine whether a first precoding is applied to the DMRS and the PCRS, and estimate channel information by using the DMRS and the PCRS based on whether is the first precoding is applied to the DMRS and the PCRS.

In accordance with an aspect of the present disclosure, since the base station transmits the PCRS and the terminal receives the PCRS and estimates channel information with a compensated phase noise, a more efficient signal transmission and reception are performed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
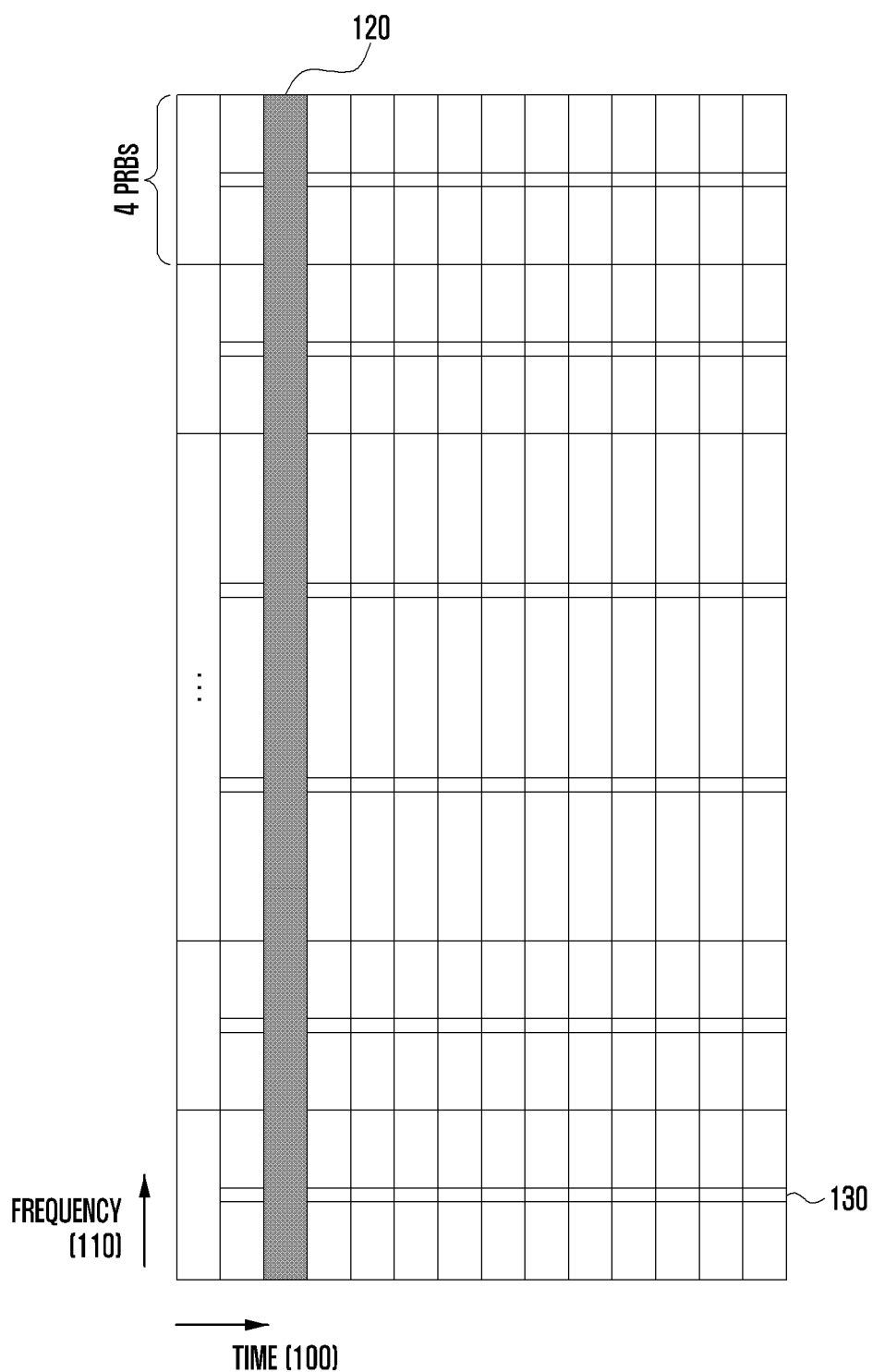
FIG. 1 is a diagram illustrating an example in which a demodulation reference signal (DMRS) and a phase compensation reference signal (PCRS) are mapped based on frequency-time resources according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements are exaggerated, omitted or schematically shown in the accompanying drawings. Also, the size of each element does not entirely reflect the actual size. In the drawings, the same or corresponding elements are denoted by the same reference numerals.

The advantages and features of the present disclosure and the manner of achieving them will become apparent with reference to the embodiments described in detail below with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. To fully disclose the scope of the disclosure to those skilled in the art, and the disclosure is only defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Wireless communication systems provide high-speed, high-quality packet data services, based on communication standards such as the 3rd generation partnership project (3GPP) long term evolution (LTE) or evolved universal terrestrial radio access (E-UTRA), LTE-advanced (LTE-A), IEEE 802.16e, and the like. In addition, standards for the 5th generation (5G) wireless communication system or new radio (NR) communication standards are now studied. The present disclosure may be applied to the 5G system and any other similar communication system by those of skilled in the art.

For signal transmission, the LTE and LTE-A systems employ the orthogonal frequency division multiplexing (OFDM) scheme for downlink (DL) and the single carrier frequency division multiple access (SC-FDMA) scheme for uplink (UL). In this OFDM-based wireless communication system according to the related art, a common phase error (CPE) which commonly affects all OFDM subcarriers may be estimated and compensated for by using a reference signal in the frequency domain.

To ensure an efficient frequency band, the next generation communication systems are expected to use high frequency bands such as millimeter waves (mmWave). In such a high frequency band, signal attenuation due to the influence of a phase error largely occurs. The phase error is caused by the incompleteness of an oscillator. Particularly, in communication environments that use higher order modulation schemes (e.g., 16QAM, 64QAM, 256QAM), the signal restoration capability is affected by inter-carrier interference (ICI) that occurs because of the phase error. To estimate this phase error, a phase compensation reference signal (PCRS) may be introduced in the 5G system.

A demodulation reference signal (DMRS) used in the 5G system may be transmitted through a specific OFDM symbol in a subframe. In the corresponding OFDM symbols, a plurality of DMRS antenna ports may be simultaneously transmitted without interference between them by using frequency division multiplexing (FDM) scheme, a code division multiplexing (CDM) scheme, or a FDM and CDM scheme.

FIG. 1 is a diagram illustrating an example in which a DMRS and a PCRS are mapped based on frequency-time resources according to an embodiment of the present disclosure.

Referring to FIG. 1, the DMRS 120 may be transmitted in resources on the time axis 100 and the frequency axis 110, and may be transmitted only in the third symbol along the frequency axis.

The PCRS 130 may be transmitted through the remaining OFDM symbols except some OFDM symbols along the time axis in the subframe. In the corresponding OFDM symbols, a plurality of PCRS antenna ports may be simultaneously transmitted without interference between them by using the FDM scheme, the CDM scheme, or the FDM and CDM scheme. For example, as shown in FIG. 1, the PCRS 130 may be transmitted in the remaining OFDM symbols except the third OFDM symbol for transmitting the DMRS and the first OFDM symbol for transmitting DL control information.

For example, a base station may allocate up to two PCRS antenna ports using two resource elements (REs) per four resource blocks (RBs) (including 48 REs on the frequency axis), based on the FDM, and then transmit them to a terminal.

The base station may allocate DMRS antenna ports (hereinafter, may be shortly referred to as ports) $p_1, \ldots, p_M$ to the terminal by using downlink control information (DCI). For example, $p_1$ may have one of values in a set $\{8, 9, \ldots, 15\}$.

Figure 2:
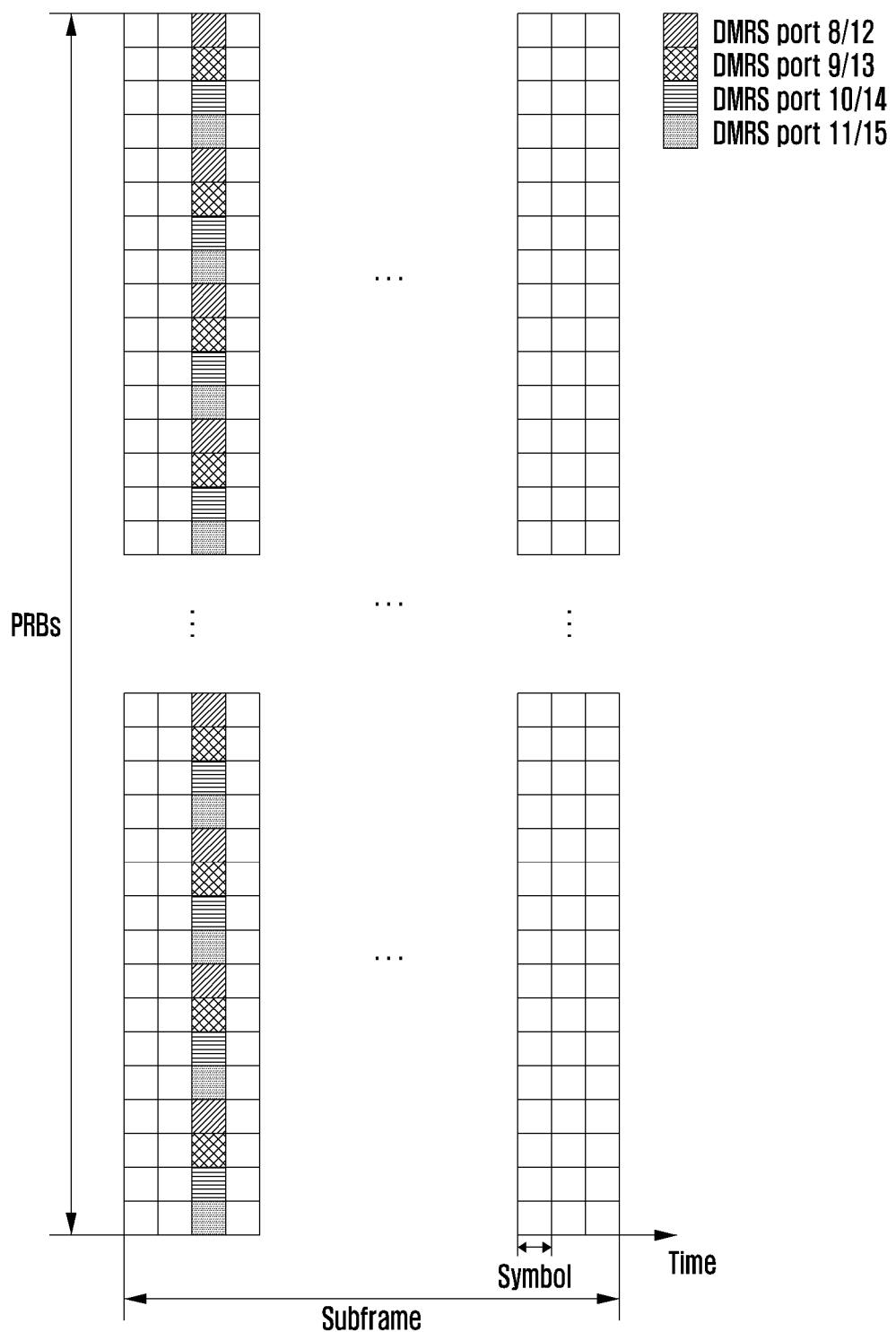
FIG. 2 is a diagram illustrating an example in which a DMRS is mapped based on frequency-time resources according to an embodiment of the present disclosure.

FIG. 2 is a diagram illustrating an example in which a DMRS is mapped based on frequency-time resources according to an embodiment of the present disclosure.

Referring to FIG. 2, the DMRS may be transmitted via FDM and CDM to different REs for each port. Namely, the FDM may be applied to port numbers $\{8, 9, 10, 11\}$ for transmission on different REs according to port numbers. Also, the FDM may be applied to port numbers $\{12, 13, 14, 15\}$ for transmission on different REs according to port numbers. Meanwhile, the RE resource of the same location is used for port numbers $\{8, 12\}$ and for transmission based on the CDM. Also, the RE resource of the same location is used for port numbers $\{9, 13\}$ and for transmission based on the CDM. Also, the RE resource of the same location is used for port numbers $\{10, 14\}$ and for transmission based on the CDM. Also, the RE resource of the same location is used for port numbers $\{11, 15\}$ and for transmission based on the CDM.

The above-described DMRS may be generated, mapped to the RE, and transmitted according to a detailed method described below in Table 1. However, embodiments of the present disclosure are not limited to a specific method as shown in Table 1. Namely, embodiments of the present disclosure may be also applied to the DMRS generated by any other method.

TABLE 1

6.7.1 UE specific reference signals associated with xPDSCH
UE-specific reference signals associated with xPDSCH
are transmitted on antenna port(s), p ∈ {8,9, ... 15}, indicated via DCI.
are present and are a valid reference for xPDSCH demodulation only if the xPDSCH
transmission is associated with the corresponding antenna port according to [3];
are transmitted only on the physical resource blocks upon which the corresponding
xPDSCH is mapped.
A UE-specific reference signal associated with xPDSCH is not transmitted in
resource elements (k,l) in which one of the physical channels are transmitted using
resource elements with the same index pair (k, l) regardless of their antenna portp.
6.7.1.1 Sequence generation
For any of the antenna ports p ∈ {8, 9, ... , v + 7 }, the reference-signal sequence
r(m) is defined by $$r(m) = \frac{1}{\sqrt{2}}(1 - 2 \cdot c(2m)) + j\frac{1}{\sqrt{2}}(1 - 2 \cdot c(2m+1)), m = 0, 1, \ldots, 3N_{RB}^{max,DL} - 1.$$

The pseudo-random sequence c ( i ) is defined in clause 7.2. The pseudo-random
sequence generator shall be initialised with
    $C_{init} = (\lfloor n_s/2 \rfloor + 1) \cdot (2n_{ID}^{(nSCID)} + 1) \cdot 2^{16} + n_{SCID}$
at the start of each subframe.
The quantities $n_{ID}^{(i)}$, i = 0, 1, are given by
$n_{ID}^{(i)} = N_{ID}^{cell}$ if no value for $n_{ID}^{DMRS,i}$ is provided by higher layers
$n_{ID}^{(i)} = n_{ID}^{DMRSi}$ otherwise
The value of $n_{SCID}$ is zero unless specified otherwise. For a xPDSCH transmission,
$n_{SCID}$ is given by the DCI format in [2] associated with the xPDSCH transmission.
6.7.1.2 Mapping to resource elements
For antenna port $p_1$ used for single port transmission, or ports $\{p_1, p_2\}$ used for two-
port transmission in a physical resource block with frequency-domain index $n_{PR\ B}$
assigned for the corresponding xPDSCH transmission, a part of the reference signal
sequence r(m) shall be mapped to complex-valued modulation symbols $a_{k,l}^{(p)}$ in
a subframe according to $$a_{k,l}^{(p)} = w_p(k'') \cdot r(k''')$$

where $$k = 4m' + N_{sc}^{RB} \cdot n_{PRB} + k'$$

$$k' = \begin{cases} 0 & p \in \{8, 12\} \\ 1 & p \in \{9, 13\} \\ 2 & p \in \{10, 14\} \\ 3 & p \in \{11, 15\} \end{cases}$$

$$k'' = \begin{cases} 0 & \text{if } k \bmod 8 < 4 \\ 1 & \text{if } 4 \leq k \bmod 8 \leq 7 \end{cases}$$

$$k''' = \left\lfloor \frac{k}{4} \right\rfloor l = 2(\text{in even slot only})$$

$$m' = 0, 1, 2$$

The sequence $\overline{w}_p(i)$ is given by Table 6.7.1.2-1.
Table 6.7.1.2-1: The sequence $\overline{w}_p(i)$ TABLE 1-continued

| Antenna port p | $[\overline{w}_p(0) \overline{w}_p(1)]$ |
|---|---|
| 8 | [+1 +1] |
| 9 | [+1 +1] |
| 10 | [+1 +1] |
| 11 | [+1 +1] |
| 12 | [+1 −1] |
| 13 | [+1 −1] |
| 14 | [+1 −1] |
| 15 | [+1 −1] |

Resource elements (k, l) used for transmission of UE-specific reference signals to one UE on any of the antenna ports in the set s, where S = {8, 12}, S = {9,13}, S = {10, 14} or S = {11, 15} shall not be used for transmission of xPDSCH on oany antenna port in the same subframe, and not be used for UE-specific references signals to the same UE on any antenna port other than those in s in the same subframe.

The base station may allocate PCRS ports $q_1, \ldots, q_K$ to the terminal by using the DCI. For example, $q_i$ may have one of values in a set {60, 61}. Alternatively, the PCRS port $q_i$ may have the same value as the DMRS port $p_i$ has. For example, $q_i$ may have one of values in a set {8, 9, ..., 15}. Allocation information for the PCRS port may be explicitly included in the DCI, and in this case the DCI may include values of the PCRS ports $q_1, \ldots, q_K$. Meanwhile, allocation information for the PCRS port may be implicitly included in the DCI, and in this case the DCI may not explicitly include the PCRS ports $q_1, \ldots, q_K$. In this case, the terminal may presume the PCRS port allocation information according to methods proposed by embodiments of the present disclosure and perform related operations.

Figure 3:
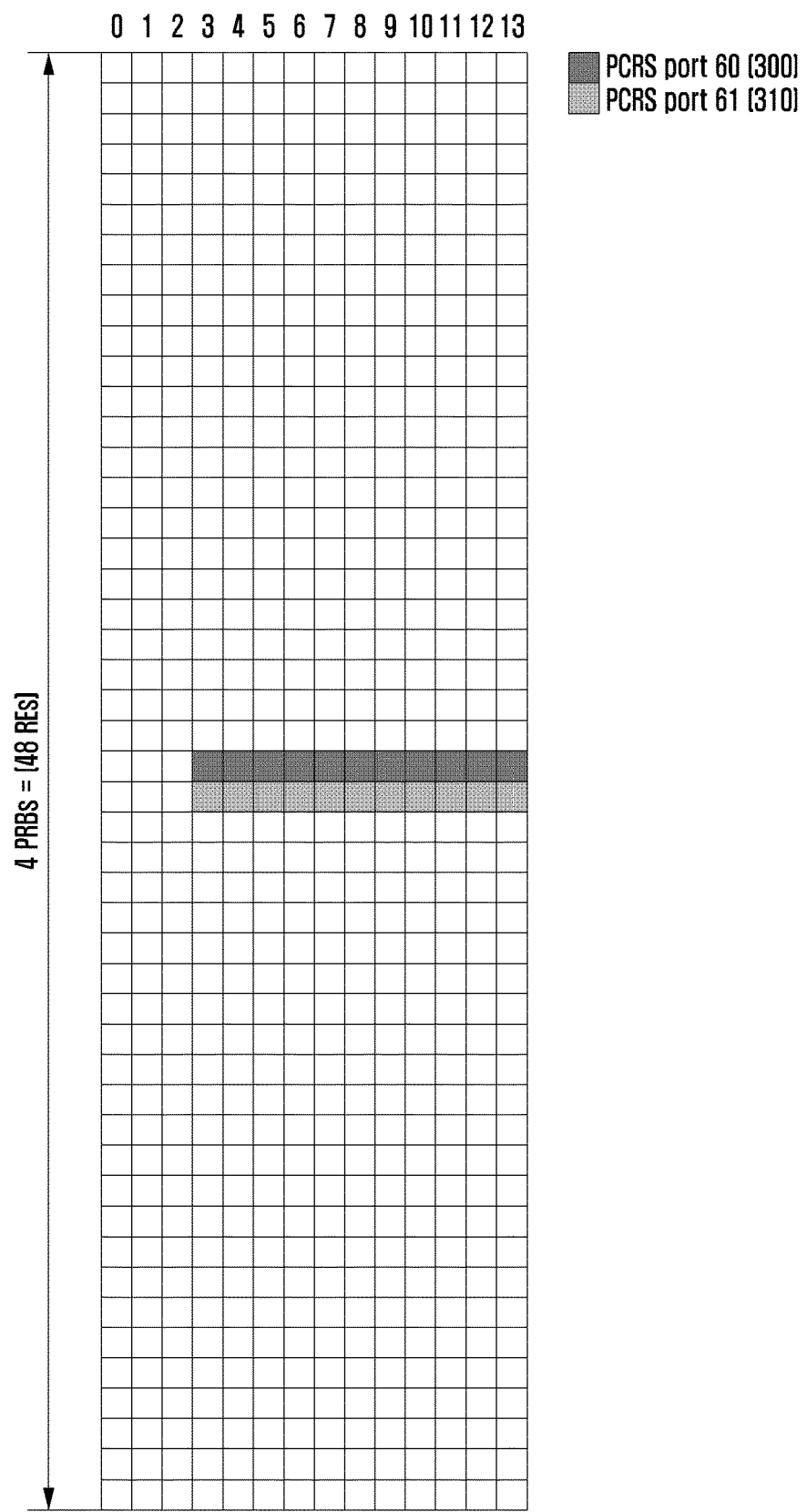
FIG. 3 is a diagram illustrating an example in which a PCRS is mapped based on frequency-time resources according to an embodiment of the present disclosure.

FIG. 3 is a diagram illustrating an example in which a PCRS is mapped based on frequency-time resources according to an embodiment of the present disclosure.

Referring to FIG. 3, the PCRS may be mapped to different REs for to port 300 and port 310 and having values in a set {60, 61}, namely, being FDM, and then transmitted.

The PCRS may be generated, mapped to the RE, and transmitted according to a detailed method described below in Table 2 with respect to PCRS ports 300 and 310 having values in a set {60, 61}. However, embodiments of the present disclosure are not limited to a specific method as shown in Table 2. Namely, embodiments of the present disclosure may be also applied to the PCRS generated by any other method.

TABLE 2

6.7.6 DL Phase noise compensation reference signal
Phase noise compensation reference signals associated with xPDSCH
are transmitted on antenna port(s) p = 60 and/or p = 61 as signaled in DCI format in [2];
are present and are a valid reference for phase noise compensation only if the xPDSCH transmission is associated with the corresponding antenna port according to [3];
are transmitted only on the physical resource blocks and symbols upon which the corresponding xPDSCH is mapped;
are identical in all symbols corresponding to xPDSCH allocation.
6.7.6.1 Sequence generation
For any of the antenna ports p ∈ {60 ,61}, the reference-signal sequence $r(m)$ is defined by $$r(m) = \frac{1}{\sqrt{2}}(1 - 2 \cdot c(2m)) + j\frac{1}{\sqrt{2}}(1 - 2 \cdot c(2m + 1)), m = 0, 1, \ldots, \lfloor N_{RB}^{max,DL}/4 \rfloor - 1.$$

The pseudo-random sequence $c(i)$ is defined in clause 7.2. The pseudo-random sequence generator shall be initialised with
$c_{init} = (\lfloor n_s/2 \rfloor + 1) \cdot (2n_{ID}^{(nSCID)} + 1) \cdot 2^{16} + n_{SCID}$
at the start of each subframe.
The quantities $n_{ID}^{(i)}$, i = 0, 1, are given by
$n_{ID}^{(i)} = N_{ID}^{cell}$ if no value for $N_{ID}^{PCRS,i}$ is provided by higher layers
$n_{ID}^{(i)} = N_{ID}^{PCRS,i}$ otherwise
The value of $n_{SCID}$ is zero unless specified otherwise. For a xPDSCH transmission, $n_{SCID}$ is given by the DCI format in [2] associated with the xPDSCH transmission.
6.7.6.2 Mapping to resource elements
For antenna ports $p \in \{60, 61\}$, in a physical resource block with frequency-domain index $n_{PR\_B}'$ assigned for the corresponding xPDSCH transmission, a part of the reference signal sequence $r(m)$ shall be mapped to complex-valued modulation symbols $a_{k,l}^{(p)}$ for all xPDSCH symbols in a subframe according to:
$a_{k,l}^{(p)} = r(k'')$,
where p' is the demodulation reference signal port number associated with xPDSCH transmission.
nxpRBDscH
The starting resource block number of xPDSCH physical resource allocation $n_{PRB}^{xPDSCH}$ in the frequency domain, resource allocation bandwidth in terms of number of resource blocks $n_{PRB}^{xPDSCH}$ and resource elements (k, l') in a subframe is given by
$k = N_{sc}^{RB} \cdot (n_{PRB}^{xPDSCH} + k'' \cdot 4) + k'$ TABLE 2-continued $$k' = \begin{cases} 24 & p \in 60 \\ 23 & p \in 61 \end{cases}$$

k" = ⌊m'/4⌋
l' = l'$_{first}$$^{xPDSCH}$, ..., l'$_{last}$$^{xPDSCH}$
m' = 0, 1, 2, ..., n$_{PRB}$$^{xPDSCH}$ − 1
where l' is the symbol index within a subframe. l'$_{first}$$^{xPDSCH}$ and l'$_{last}$$^{xPDSCH}$ are symbol indices of the first and last of xPDSCH, respectively for the given subframe. Resource elements (k, l') used for transmission of UE-specific phase noise compensation reference signals on any of the antenna ports in the set S, where S = {60} and S = {61} shall not be used for transmission of xPDSCH on any antenna port in the same subframe.

Hereinafter, an embodiment of the present disclosure will be described with respect to an associated relation for phase tracking between a DMRS antenna port group (or a port group) and a PCRS antenna port. Specifically, a method for associating a single PCRS port to be used for phase tracking with a DMRS antenna port group formed of one or more DMRS ports is described.

An associated relation between a DMRS port $p_i$ and a PCRS port $q_i$, which are allocated to the terminal by the base station using one DCI, may be defined as follows.

If the base station allocates one DMRS port $p_1$ and one PCRS port $q_1$ to the terminal, the terminal may presume that there is the associated relation between the allocated DMRS port $p_1$ and the allocated PCRS port $q_1$.

If the base station allocates two or more DMRS ports $p_1, \ldots, p_N$ and one PCRS port $q_1$ to the terminal, the terminal may presume that there is the associated relation between all the DMRS ports $p_1, p_N$ and one PCRS port $q_1$ (Namely, this means a mapping relation of N:1.). In this case, the DMRS ports $p_1, \ldots, p_N$ may be referred to as one DMRS port group, and all the DMRS ports included in the one DMRS port group have the associated relation with the PCRS port $q_1$.

If the base station allocates the same number of DMRS ports $p_1, \ldots, p_N$ and PCRS ports $q_1, \ldots, q_N$ to the terminal, the terminal may presume that there is the associated relation between antenna ports having the same index value (j=i) in each DMRS port $p_j$ and each PCRS port $q_i$.

If the base station allocates a different number of DMRS ports $p_1, \ldots, p_N$ and PCRS ports $q_1, \ldots, q_M$ to the terminal, the base station may further deliver information, j=Func$_{mapping}$(i), about a mapping relation between N DMRS ports $p_j$ and M PCRS ports $q_i$ to the terminal through the downlink control information (DCI). Based on this information about the mapping relation, the terminal may presume that there is the associated relation between the DMRS port $p_j$ and the PCRS port $q_i$. Information about one or more mapping relations may be set in advance in the terminal by using radio resource control (RRC) signaling or a media access control (MAC) control element (CE). The base station may instruct the terminal on which mapping relation will be applied, using the DCI.

If the base station allocates the DMRS and PCRS ports to the terminal by using two or more DCI, the associated relation between the DMRS port $p_i$ and the PCRS port $q_i$ may be defined as follows. In embodiments of the present disclosure, it is presumed that the base station uses K DCI. In the following description, one of the K DCI (i.e., DCI$_1$, DCI$_2$, ..., DCI$_K$) will be referred to as DCI$_k$.

If the base station allocates one DMRS port $p_{1,k}$ and one PCRS port $q_{1,k}$ to the terminal by using DCI$_k$, the terminal may presume that there is the associated relation between the allocated DMRS port $p_{1,k}$ and the allocated PCRS port $q_{1,k}$.

If the base station allocates two or more DMRS ports $p_{1,k}, \ldots, p_{N,k}$ and one PCRS port $q_{1,k}$ to the terminal by using DCI$_k$, the terminal may presume that there is the associated relation between all the DMRS ports $p_{1,k}, \ldots, p_{N,k}$ and one PCRS port $q_{1,k}, \ldots$, (Namely, this means a mapping relation of N:1.). In this case, the DMRS ports $p_{1,k}, \ldots, p_{N,k}$ may be referred to as one DMRS port group, and all the DMRS ports included in the one DMRS port group have the associated relation with the PCRS port $q_{1,k}$.

If the base station allocates the same number of DMRS ports $p_{1,k}, \ldots, p_{N,k}$ and PCRS ports $q_{1,k}, \ldots, q_{N,k}$ to the terminal by using DCI$_k$, the terminal may presume that there is the associated relation between antenna ports having the same index value (j=i) in each DMRS port $p_{j,k}$ and each PCRS port $q_{1,k}$.

If the base station allocates a different number of DMRS ports $p_{1,k}, \ldots, p_{N,k}$ and PCRS ports $q_{1,k}, \ldots, q_{M,k}$ to the terminal by using DCI$_k$, the base station may further deliver information, j=Func$_{mapping}$(i), about a mapping relation between N DMRS ports $p_{j,k}$ and M PCRS ports $q_{1,k}$ to the terminal through the DCI. Based on this information about the mapping relation, the terminal may presume that there is the associated relation between the DMRS port $p_{j,k}$ and the PCRS port $q_{1,k}$. Information about one or more mapping relations may be set in advance in the terminal by using RRC signaling or a MAC CE. The base station may instruct the terminal on which mapping relation will be applied, using the DCI.

In addition to the above-discussed method using a plurality of DCI, a plurality of DMRS and PCRS allocation information fields included in one DCI may be used. Namely, in order to deliver the DMRS and PCRS allocation information, one DCI may include an information field 1, an information field 2, ..., and an information field K. In this case, a phrase "DCI$_k$" used in the above description may be replaced by "the k-th information field for DMRS and PCRS allocation".

If the base station allocates the DMRS and PCRS ports to the terminal by using K information fields included in one DCI, the associated relation between the DMRS port $p_i$ and the PCRS port $q_i$ which are allocated in one information field may be defined as follows.

If the base station allocates one DMRS port $p_{1,k}$ and one PCRS port $q_{1,k}$ to the terminal by using the k-th information field, the terminal may presume that there is the associated relation between the allocated DMRS port $p_{1,k}$ and the allocated PCRS port $q_{1,k}$.

If the base station allocates two or more DMRS ports $p_{1,k}, \ldots, p_{N,k}$ and one PCRS port $q_{1,k}$ to the terminal by using the k-th information field, the terminal may presume that there is the associated relation between all the DMRS ports $p_{1,k}, \ldots, p_{N,k}$ and one PCRS port $q_{1,k}$ (Namely, this means a mapping relation of N:1.). In this case, the DMRS ports $p_{1,k}, \ldots, p_{N,k}$ may be referred to as one DMRS port group, and all the DMRS ports included in the one DMRS port group have the associated relation with the PCRS port $q_{1,k}$.

If the base station allocates the same number of DMRS ports $p_{1,k}, \ldots, p_{N,k}$ and PCRS ports $q_{1,k}, \ldots, q_{N,k}$ to the terminal by using the k-th information field, the terminal may presume that there is the associated relation between antenna ports having the same index value (j=i) in each DMRS port $p_{j,k}$ and each PCRS port $q_{1,k}$.

If the base station allocates a different number of DMRS ports $p_{1,k}, \ldots, p_{N,k}$ and PCRS ports $q_{1,k}, \ldots, q_{M,k}$ to the terminal by using the k-th information field, the base station may further deliver information, j=Func$_{mapping}$(i), about a mapping relation between N DMRS ports $p_{j,k}$ and M PCRS ports $q_{i,k}$ to the terminal through the DCI. Based on this information about the mapping relation, the terminal may presume that there is the associated relation between the DMRS port $p_{j,k}$ and the PCRS port $q_{i,k}$.

According to embodiments of the present disclosure, information about the associated relation between the DMRS port and the PCRS part may be set in the terminal by the base station through RRC signaling or a MAC CE message. One associated relation includes information about a pair of (j, i) having a relation of j=Func$_{mapping}$(i), and this information about a pair is defined as N pieces for different j values. The terminal may presume that the DMRS port pj and the PCRS port $q_{i,k}$ corresponding to the one pair (j, i) have the associated relation with each other.

Table 3 below shows three different associated relations in case of N=4 and M=2. As shown in Table 3, one or more associated relations may be set in the terminal through the RRC signaling or the MAC CE message with respect to specific N and M values, and each of the set associated relations may have a unique index. The base station may instruct the terminal on the index of one of the set associated relations through the DCI. The terminal may apply the associated relation corresponding to the instructed index to the associated relation between DMRS and PCRS ports allocated through the DCI.

TABLE 3

| Index for associated relation | Mapping rule (j, i) respectively for DMRS port $p_j$ and PCRS port $q_i$ |
|---|---|
| #1 | (j, i) = (1, 1), (2, 1), (3, 1), (4, 2) |
| #2 | (j, i) = (1, 1), (2, 1), (3, 2), (4, 2) |
| #3 | (j, i) = (1, 1), (2, 2), (3, 2), (4, 2) |

According to another embodiment of the present disclosure, an explicit associated relation between the DMRS port number p and the PCRS port number q may be set in advance in the terminal by the base station through the RRC signaling or the MAC CE. For example, when DMRS ports 8, 9, 10, . . . , 16 and PCRS ports 60, 61 are defined in the standard, the base station may set a specific DMRS port number p that has an associated relation with a specific PCRS port number q.

Table 4 below shows associated relations between the DMRS port and the PCRS port which are settable by the base station. Specifically, according to the first associated relation defined in Table 4, the PCRS port 60 has the associated relation with the DMRS ports 8, 9, 10 and 11, and the PCRS port 61 has the associated relation with the DMRS ports 12, 13, 14 and 15. According to the second associated relation defined in Table 4, the PCRS port 60 has the associated relation with the DMRS ports 8, 10, 12 and 14, and the PCRS port 61 has the associated relation with the DMRS ports 9, 11, 13 and 15. According to the third associated relation in Table 4, the PCRS port 60 has the associated relation with all the DMRS ports. According to the fourth associated relation in Table 4, the PCRS port 61 has the associated relation with all the DMRS ports.

If one or more associated relations may be set through the RRC signaling or the MAC CE, each of the set associated relations may have a unique index. The base station may instruct the terminal on the index of one of the set associated relations through the DCI. The terminal may apply the associated relation corresponding to the instructed index to the associated relation between DMRS and PCRS ports allocated through the DCI.

TABLE 4

| Index for associated relation | PCRS port | DMRS port |
|---|---|---|
| #1 | 60 | 8, 9, 10, 11 |
|  | 61 | 12, 13, 14, 15 |
| #2 | 60 | 8, 10, 12, 14 |
|  | 61 | 9, 11, 13, 15 |
| #3 | 60 | 8, 9, 10, 11, 12, 13, 14, 15 |
| #4 | 61 | 8, 9, 10, 11, 12, 13, 14, 15 |

In addition, the base station may correlate the DMRS ports, which are expected to cause phase noises of the same value, with one PCRS port.

If it is expected that phase noises of the same value will occur on all the DMRS ports allocated to the terminal, the base station may set all DMRS ports $p_1, \ldots, p_N$ allocated by the above-discussed method to have the associated relation with one PCRS port $q_1$.

If it is expected that phase noises of different values will occur on the respective DMRS ports allocated to the terminal, the base station may set the antenna ports having the same index value (j=i) to have the associated relation with each other among the DMRS ports $p_j$ and the PCRS ports $q_i$ allocated by the above-discussed method.

If it is expected that phase noises of the same value will occur on some of the DMRS ports allocated to the terminal and further phase noises of different values will occur on the others, the base station may allocate one PCRS port to only some of the DMRS ports on which phase noises of the same value are expected to occur.

In addition to the above-described phase noise, the base station may correlate the DMRS ports, which are expected to cause time-axis channel variations of the same value for each symbol, with one PCRS port. Therefore, although only the phase noise estimation is exemplarily used for the following description, the present disclosure is not limited to the phase noise estimation and may be also applied to all kinds of time-axis channel variations.

Regarding the PCRS port $q_i$ and the DMRS port $p_j$ which have an associated relation with each other, the terminal may use information estimated based on the PCRS port $q_i$ to compensate information estimated on the associated DMRS port $p_j$. The information estimated using the PCRS port $q_i$ may be phase noise information for OFDM symbols in the subframe, channel variation information that is time-varying between adjacent OFDM symbols in the subframe, or channel information estimated in a specific OFDM symbol in the subframe. The estimated channel information refers to channel information to which arbitrary precoding is applied according to the multiple-input and multiple-output (MIMO) transmission scheme used by the base station.

The compensation of the information estimated on the DMRS port may include compensation for channel information that varies by a phase noise for each OFDM symbol, compensation for channel information that varies with time between OFDM symbols, or compensation for both the channel information varying by a phase noise for each OFDM symbol and the channel information time-varying between OFDM symbols.

Hereinafter, various embodiments of the present disclosure will be described with respect to a channel estimation method of the terminal using one DMRS port and one PCRS port which are associated with each other.

If the same precoding is applied to the DMRS port $p_j$ and the PCRS port q, which are associated with each other, the terminal may perform the following channel estimation method using this. In this case, $\tilde{h}_{k,2}^{p_j}$ denotes channel information of the DMRS port $p_j$ with respect to the second OFDM symbol and the k-th RE, and may be estimated by the terminal using the DMRS port $p_j$ located in the second OFDM symbol. $\tilde{h}_{k,1}^{q_i}$ denotes channel information of the PCRS port $q_i$ with respect to the l-th OFDM symbol and the k-th RE, and may be estimated by the terminal using the PCRS port $q_i$ located in the l-th OFDM symbol.

If the same precoding is applied to the DMRS port $p_j$ and the PCRS port $q_i$, the terminal may estimate a channel value for the DMRS port $p_j$ with respect to the l-th OFDM symbol and the k-th RE, as shown in Equation 1.

$$\tilde{h}_{k,l}^{p_j} = |\tilde{h}_{k,2}^{p_j}| \exp(j \angle(\tilde{h}_{k,l}^{q_i})) \qquad \text{Equation 1}$$

If the same precoding is applied to the DMRS port $p_j$ and the PCRS port $q_i$, the terminal may also estimate a channel value for the DMRS port $p_j$ with respect to the l-th OFDM symbol and the k-th RE, as shown in Equation 2.

$$\tilde{h}_{k,l}^{p_j} = \tilde{h}_{k,2}^{p_j} \exp(j \Delta\tilde{\theta}_{k,l}) \qquad \text{Equation 2}$$

Herein, a phase difference value for the k-th RE between the second OFDM symbol and the l-th OFDM symbol may be estimated as shown in Equation 3. In order to increase the estimation accuracy, the terminal may use a value obtained by taking a cumulative average of a plurality of RE indexes k. In this case, a phase difference may be caused by the above-described phase noise, or may be caused by a time-varying channel in a situation where the terminal moves.

$$\Delta\tilde{\theta}_{k,l} = \angle(\tilde{h}_{k,l}^{q_i}(\tilde{h}_{k,l}^{q_i})^*) \qquad \text{Equation 3}$$

If different precodings are applied to the DMRS port $p_j$ and the PCRS port $q_i$ which are associated with each other, the terminal may perform the following channel estimation method using this. In this case, $\tilde{h}_{k,2}^{p_j}$ denotes channel information of the DMRS port $p_j$ with respect to the second OFDM symbol and the k-th RE, and may be estimated by the terminal using the DMRS port $p_j$ located in the second OFDM symbol. $\tilde{h}_{k,l}^{q_i}$ denotes channel information of the PCRS port $q_i$ with respect to the l-th OFDM symbol and the k-th RE, and may be estimated by the terminal using the PCRS port $q_i$ located in the l-th OFDM symbol.

A phase difference value for the k-th RE in the l-th OFDM symbol may be estimated as shown in Equation 4.

In order to increase the estimation accuracy, the terminal may use a value obtained by taking a cumulative average of a plurality of RE indexes k. In this case, a phase difference may be caused by the above-described phase noise, or may be caused by a time-varying channel in a situation where the terminal moves. Also, depending on a reception algorithm of the terminal, a value of a channel magnitude difference as well as a phase difference may be estimated.

$$\Delta\tilde{\theta}_{k,l} = \angle(\tilde{h}_{k,l}^{q_i}(\tilde{h}_{k,l}^{q_i})^*) \qquad \text{Equation 4}$$

In case of the DMRS port $p_j$ to which precoding different from that of the PCRS port $q_i$ is applied, the channel value for the DMRS port $p_j$ with respect to the l-th OFDM symbol and the k-th RE may be estimated as shown in Equation 5.

$$\tilde{h}_{k,3}^{p_j} = \tilde{h}_{k,2}^{p_j} \exp(j \angle(\Delta\tilde{\theta}_{k,3}))$$

$$\tilde{h}_{k,4}^{p_j} = \tilde{h}_{k,2}^{p_2} \exp(j \angle(\Delta\tilde{\theta}_{k,3} + \Delta\tilde{\theta}_{k,4}))$$

$$\tilde{h}_{k,l}^{p_j} = \tilde{h}_{k,2}^{p_2} \exp(j \angle(\Delta\tilde{\theta}_{k,3} + \Delta\tilde{\theta}_{k,4} + \ldots + \Delta\tilde{\theta}_{k,l})) \qquad \text{Equation 5}$$

If the same precoding is applied to the DMRS port $p_1$ and the PCRS port $q_1$ with respect to the DMRS ports $p_1$, $p_2$ and the PCRS port $q_1$ which are associated with each other, the terminal may perform the following channel estimation method using this. In this case, $\tilde{h}_{k,2}^{p_j}$ denotes channel information of the DMRS port $p_j$ with respect to the second OFDM symbol and the k-th RE, and may be estimated by the terminal using the DMRS port $p_j$ located in the second OFDM symbol. $\tilde{h}_{k,l}^{q_1}$ denotes channel information of the PCRS port $q_1$ with respect to the l-th OFDM symbol and the k-th RE, and may be estimated by the terminal using the PCRS port $q_1$ located in the l-th OFDM symbol.

If the same precoding is applied to the DMRS port $p_1$ and the PCRS port $q_1$, a channel value for the DMRS port $p_1$ with respect to the l-th OFDM symbol and the k-th RE may be estimated as shown in Equation 6.

$$\tilde{h}_{k,l}^{p_1} = |\tilde{h}_{k,2}^{p_1}| \exp(j \angle(\tilde{h}_{k,l}^{q_1})) \qquad \text{Equation 6}$$

In case of the DMRS port $p_1$ to which the same precoding as that of the PCRS port $q_1$ is applied, the channel value for the DMRS port $p_1$ with respect to the l-th OFDM symbol and the k-th RE may be estimated as shown in Equation 7.

$$\tilde{h}_{k,l}^{p_1} = \tilde{h}_{k,2}^{p_1} \exp(j \Delta\tilde{\theta}_{k,l}) \qquad \text{Equation 7}$$

A phase difference value for the k-th RE in the l-th OFDM symbol may be estimated as shown in Equation 8. In order to increase the estimation accuracy, the terminal may use a value obtained by taking a cumulative average of a plurality of RE indexes k. In this case, a phase difference may be caused by the above-described phase noise, or may be caused by a time-varying channel in a situation where the terminal moves. Also, depending on a reception algorithm of the terminal, a value of a channel magnitude difference as well as a phase difference may be estimated.

$$\Delta\tilde{h}_{k,l} = \angle(\tilde{h}_{k,l}^{q_1}(\tilde{h}_{k,2}^{p_1})^*) \qquad \text{Equation 8}$$

Since the PCRS port $q_1$ and the DMRS ports ($p_1$, $p_2$) are associated with each other for the phase estimation, the terminal may use the phase variation value, estimated using the DMRS port $p_1$ and the PCRS port $q_1$, for a phase correction of a channel estimated with respect to the DMRS port $p_2$. In case of the DMRS port $p_2$ to which precoding different from that of the PCRS port $q_1$ is applied, the channel value for the DMRS port $p_2$ with respect to the l-th OFDM symbol and the k-th RE may be estimated as shown in Equation 9.

$$\tilde{h}_{k,l}^{p_2} = \tilde{h}_{k,2}^{p_2} \exp(j \angle(\Delta\tilde{\theta}_{k,l})) \qquad \text{Equation 9}$$

Hereinafter, various embodiments of the present disclosure will be described regarding a method for applying the same precoding to both one DMRS port and one DMRS port.

The associated relation for phase noise estimation between one DMRS port group and one PCRS port may be presumed. The one DMRS port group is presumed as being formed of DMRS ports $p_1, p_2, \ldots, p_N$, and the one PCRS port is presumed as $q_1$. In this case, N=1 or N>1. In addition, the associated relation for phase noise estimation between M DMRS port groups and M PCRS ports may be presumed. In this case, the m-th DMRS port group has the associated relation with the PCRS port $q_m$ for phase noise estimation. In this case, one DMRS port group may be formed of one DMRS port (N=1) or formed of two or more DMRS ports (N>1).

The above-described various embodiments may be used to define the associated relation for the phase noise estimation. This is, however, exemplary only and not to be construed as a limitation. Alternatively, any other method may be used to define the associated relation for the phase noise estimation. The following description may be applied based on the associated relation for phase noise estimation between given one DMRS port group and one PCRS port, and may be irrelevant to a detailed method regarding how to define the associated relation for the phase noise estimation.

One DMRS port included in the one DMRS port group may apply the same precoding as that of the one PCRS port.

With respect to the PCRS port $q_i$ and the DMRS port $p_j$ which have the associated relation with each other, the base station may use the same MIMO transmission scheme but may not apply the same arbitrary precoding.

Also, with respect to the PCRS port $q_i$ and the DMRS port $p_j$ which have the associated relation with each other, the base station may use the same MIMO transmission scheme and apply the same arbitrary precoding.

If the number of DMRS ports is equal to the number of associated PCRS ports (namely, in case of N=1), the base station may apply the same precoding to each of the DMRS port $p_i$ and the associated PCRS port $q_i$. Namely, the terminal may presume that the same precoding is applied to each of the DMRS port $p_i$ and the associated PCRS port $q_i$. The base station may explicitly deliver allocation information for the DMRS port and allocation information for the PCRS port to the terminal through the DCI. Alternatively, the base station may explicitly deliver allocation information for only the DMRS port to the terminal through the DCI, and may instruct the terminal on the number of PCRS port allocations being N through the DCI. In this case, the terminal may implicitly know that the PCRS port $q_i$ which is the same as the DMRS port number is allocated (i.e., $p_i=q_i$ for i=1, \ldots, N).

If one PCRS port $q_1$ and a plurality of DMRS ports $p_1, p_2, \ldots, p_N$ have the associated relation with each other, the base station may apply the same precoding to one PCRS port $q_1$ and one DMRS port $p_1$ of the plurality of DMRS ports $p_1, p_2, \ldots, p_N$. Namely, the terminal may presume that the same precoding is applied to the DMRS port $p_1$ and the associated PCRS port $q_1$. The base station may explicitly deliver allocation information for the DMRS port and allocation information for the PCRS port to the terminal through the DCI. Alternatively, the base station may explicitly deliver allocation information for only the DMRS port to the terminal through the DCI, and may instruct the terminal on the number of PCRS port allocations being 1 through the DCI. In this case, the terminal may implicitly know that the PCRS port $q_1$ which is the same as the DMRS port number $p_1$ is allocated (i.e., $p_1=q_1$).

If the PCRS port $q_m$ and the m-th DMRS port group have the associated relation with each other, the base station may apply the same precoding to the PCRS port $q_m$ and one DMRS port $p_{1,m}$ having the lowest index from among N DMRS ports $p_{1,m}, p_{2,m}, \ldots, p_{N,m}$ included in the m-th DMRS port group. Namely, the terminal may presume that the same precoding is applied to the DMRS port $p_{1,m}$ and the PCRS port $q_m$. The base station may explicitly deliver allocation information for the DMRS port group and allocation information for the PCRS port to the terminal through the DCI. Alternatively, the base station may explicitly deliver allocation information for only the DMRS port group to the terminal through the DCI, and may instruct the terminal on the number of PCRS port allocations per DMRS port group being 1 through the DCI. In this case, the terminal may implicitly know that the PCRS port $q_m$ which is the same as the DMRS port number $p_{1,m}$ is allocated (i.e., $p_{1,m}=q_m$).

According to the above-described embodiments, the terminal may presume that the same precoding is applied to one DMRS port having the lowest index included in the one DMRS port group and one PCRS port having the associated relation with the DMRS port group. Based on the assumption of same precoding, the terminal may perform channel estimation.

In addition, based on embodiments to be described below, the terminal may be further instructed by the base station on whether the same precoding is presumed between the one DMRS port and the one PCRS port.

Through one of the following methods, the base station may inform the terminal whether the same arbitrary precoding is applied to the PCRS port $q_i$ and the DMRS port $p_i$ having the associated relation with each other.

Using one bit contained in the DCI, the base station may indicate that the same precoding is applied to the associated DMRS and PCRS ports allocated by the corresponding DCI. Namely, if the DCI indicates "1" (i.e., if 1 is included), the terminal may presume that the same precoding is applied to one PCRS port and one DMRS port included in one DMRS port group according to the above-discussed embodiments. If the DCI indicates "0", the terminal may not presume that the same precoding as the one PCRS port is applied to any DMRS port included in the one DMRS port group. Alternatively, such an indication may be applied in reverse.

Using a bitmap of length M contained in the DCI, the base station may indicate whether the same precoding is applied to the associated DMRS and PCRS ports allocated by the corresponding DCI. In this case, the number of PCRS ports allocated by the DCI is M, and one PCRS port may have the associated relation with one or more DMRS ports. Using a bitmap of length M for each of the PCRS ports, the base station may instruct the terminal on whether the same precoding is applied to each PCRS port and the associated DMRS port.

If it is instructed that the same precoding is applied to one PCRS port and the associated DMRS port, the terminal may presume that the same precoding is applied to the PCRS port and the first DMRS port among the DMRS ports associated with the PCRS port. This corresponds to the case where the associated relation for phase estimation is set to M DMRS port groups and M PCRS ports.

If the m-th bit in the bitmap of length M included in the DCI has a value "1", the terminal presume that the same precoding is applied to the PCRS port $q_m$ and the DMRS port $p_{1,m}$ having the lowest index among the DMRS ports included in the m-th DMRS port group. If the m-th bit has a value "0", the terminal may not presume that the same precoding is applied to the PCRS port $q_m$ and the DMRS port $p_{1,m}$ having the lowest index among the DMRS ports included in the m-th DMRS port group.

Based on DMRS port allocation information included in the DCI, the base station may instruct that the same precoding is applied to some DMRS port combinations and the associated PCRS port. The DMRS port allocation information may be as shown in Tables 5 and 6 below.

For example, if the DCI includes "0" as the DMRS port allocation information in accordance with Table 5, the terminal may not presume that the same precoding is applied to the DMRS port 8 and the associated PCRS port. If "1" is included, the terminal may presume that the same precoding is applied to the DMRS port 8 and the associated PCRS port. If "5" is included in Table 5, the terminal may not presume that the same precoding is applied to one or more PCRS port(s) having the associated relation with respect to the DMRS port 8 and the DMRS port 9.

If "6" is indicated in Table 5 and if one PCRS port $q_1$ having the associated relation with the DMRS ports 8 and 9 is allocated, the terminal may presume the same precoding for both the DMRS port 8 and the PCRS port $q_1$.

If "6" is indicated in Table 5 and if PCRS ports $q_1$ and $q_2$ respectively having the associated relations with the DMRS ports 8 and 9 are allocated, the terminal may presume the same precoding for both the DMRS port 8 and the PCRS port $q_1$ and may also presume the same precoding for both the DMRS port 9 and the PCRS port $q_2$.

In addition, using the DCI, the base station may inform the terminal whether single-user MIMO (SU-MIMO) transmission or multi-user MIMO (MU-MIMO) transmission. In this case, the terminal may presume that the same precoding is applied to the DMRS port and the associated PCRS port with respect to the SU-MIMO transmission only.

For the above methods, the base station may perform instructions to the terminal by using, instead of the DCI, various kinds of control information including RRC signaling, MAC CE, or system information block (SIB).

TABLE 5

| Value | Message |
|---|---|
| 0 | 1 Layer, port 8 (Ch. estimation w/o OCC) |
| 1 | 1 Layer, port 8 (Ch. estimation w/o OCC; the same precoding both for the DMRS port and its associated PCRS port) |
| 2 | 1 Layer, port 9 (Ch. estimation w/o OCC) |
| 3 | 1 Layer, port 10 (Ch. estimation w/o OCC) |
| 4 | 1 Layer, port 11 (Ch. estimation w/o OCC) |
| 5 | 2 Layers, ports {8, 9} (Ch. estimation w/o OCC) |
| 6 | 2 Layers, ports {8, 9} (Ch. estimation w/o OCC; the same precoding both for the DMRS port(s) and its associated PCRS port(s)) |
| 7 | 2 Layers, ports {10, 11} (Ch. Estimation w/o OCC) |
| 8 | 2 Layers, ports {8, 12} (OCC = 2) |
| 9 | 2 Layers, ports {9, 13} (OCC = 2) |
| 10 | 2 Layers, ports {10, 14} (OCC = 2) |
| 11 | 2 Layers, ports {11, 15} (OCC = 2) |
| 12-15 | Reserved |

TABLE 6

| Value | Message |
|---|---|
| 0 | 1 Layer, port 8 (Ch. estimation w/o OCC) |
| 1 | 1 Layer, port 8 (Ch. estimation w/o OCC; the same precoding both for the DMRS port and its associated PCRS port) |
| 2 | 1 Layer, port 9 (Ch. estimation w/o OCC) |
| 3 | 1 Layer, port 10 (Ch. estimation w/o OCC) |
| 4 | 1 Layer, port 11 (Ch. estimation w/o OCC) |
| 5 | 2 Layers, ports {8, 9} (Ch. estimation w/o OCC) |
| 6 | 2 Layers, ports {8, 9} (Ch. estimation w/o OCC; the same precoding both for the DMRS port(s) and its associated PCRS port(s)) |
| 7 | 2 Layers, ports {10, 11} (Ch. estimation w/o OCC) |
| 8 | 2 Layers, ports {8, 12} (OCC = 2) |
| 9 | 2 Layers, ports {9, 13} (OCC = 2) |
| 10 | 2 Layers, ports {10, 14} (OCC = 2) |
| 11 | 2 Layers, ports {11, 15} (OCC = 2) |
| 12 | 2 Layers, ports {8, 12} (OCC = 2; the same precoding both for the DMRS port(s) and its associated PCRS port(s)) |
| 13 | 2 Layers, ports {9, 13} (OCC = 2; the same precoding both for the DMRS port(s) and its associated PCRS port(s)) |
| 14 | 2 Layers, ports {10, 14} (OCC = 2; the same precoding both for the DMRS port(s) and its associated PCRS port(s)) |
| 15 | 2 Layers, ports {11, 15} (OCC = 2; the same precoding both for the DMRS port(s) and its associated PCRS port(s)) |

Hereinafter, various embodiments of the present disclosure will be described. This embodiment proposes a setting method for one DMRS antenna port group (or a port group) and a method for allocating one PCRS port having the same precoding as one DMRS port in the port group.

The base station may set M DMRS port groups through RRC signaling or MAC CE. Herein, M=1 or M>1. One DMRS port group may include N DMRS ports, where N=1 or N>1. Table 7 shows one method of DMRS port grouping in case of M=2 and N=4. Table 8 shows the DMRS port grouping method in case of M=1 and N=8.

TABLE 7

| DMRS port group | DMRS port(s) |
|---|---|
| Group #1 | 8, 9, 10, 11 |
| Group #2 | 12, 13, 14, 15 |

TABLE 8

| DMRS port group | DMRS port(s) |
|---|---|
| Group #1 | 8, 9, 10, 11, 12, 13, 14, 15 |
| Group #2 | Null |

The base station may allocate DMRS ports $p_1, \ldots, p_L$ to the terminal by using one DCI. Through the RRC signaling or the MAC CE setting, the terminal may know which DMRS port group includes each of the DMRS ports $p_1, \ldots, p_L$. If a modulation and coding scheme (MCS) level of a physical downlink shared channel (PDSCH) allocated through the DCI is greater than a specific threshold value, the terminal may know PCRS allocation information according to the following methods even through the DCI has no allocation information for the PCRS port. The threshold value of the MCS level of the PDSCH may be set in advance in the terminal by the base station through the RRC signaling or the MAC CE. In the following description, it is presumed that the MCS level of the PDSCH allocated by the DCI is greater than a specific threshold value.

When all of the DMRS ports $p_1, \ldots, p_L$ allocated through the DCI belong to one DMRS port group, the terminal may presume that one PCRS port $q_1$ is allocated. In this case, the one PCRS port $q_1$ may have the same value as the DMRS port $p_1$.

For example, it is presumed that the base station sets the DMRS port group as shown in Table 8 above. Thereafter, if the base station allocates the DMRS ports $(p_1, p_2)=(8, 9)$ to the terminal through one DCI, the terminal may know that the DMRS ports are all included in the same DMRS port group. Also, even though there is no specific PCRS allocation information in the DCI, the terminal may presume that one PCRS port $q_1=8$ having the same number as the first port $p_1=8$ of the allocated DMRS ports is allocated. Then the terminal may perform PCRS reception for the PCRS port $q_1=8$ at the time and frequency resource location corresponding to the RE mapping of the PCRS port $q_1=8$. The terminal may perform the operations proposed based on the presumption that the same precoding is applied to both the DMRS port $p_1=8$ and the PCRS port $q_1=8$.

In another example, it is presumed that the base station sets the DMRS port group as shown in Table 8 above. Thereafter, if the base station allocates the DMRS ports $(p_1, p_2)=(10, 11)$ to the terminal through one DCI, the terminal may know that the DMRS ports are all included in the same DMRS port group. Also, even though there is no specific PCRS allocation information in the DCI, the terminal may presume that one PCRS port $q_1=10$ having the same number as the first port $p_1=10$ of the allocated DMRS ports is allocated. Then the terminal may perform PCRS reception for the PCRS port $q_1=10$ at the time and frequency resource location corresponding to the RE mapping of the PCRS port $q_1=10$. The terminal may perform the operations proposed in an embodiment on the assumption that the same precoding is applied to both the DMRS port $p_1=10$ and the PCRS port $q_1=10$.

When the DMRS ports $p_1, \ldots, p_L$ allocated through the DCI are divided into and belong to M' DMRS port groups, the terminal may presume that M' PCRS ports $q_1, q_2, \ldots, q_{M'}$ are allocated. If DMRS ports included in the m-th DMRS port group among the DMRS ports allocated through the DCI are $\{p_{1,m}, p_{2,m}, \ldots\}$, the m-th PCRS port $q_m$ among the M' PCRS ports may have the same value as the DMRS port $p_{1,m}$.

For example, it is presumed that the base station sets the DMRS port group as shown in Table 7 above. Thereafter, if the base station allocates the DMRS ports $(p_1, p_2, p_3, p_4)=(8, 9, 12, 13)$ to the terminal through one DCI, the terminal may know that the DMRS ports are included in different M' $(=2)$ DMRS port groups. In this case, the terminal knows that the first DMRS port group has $p_1, p_2$ and the second DMRS port group has $p_3, p_4$.

Even though there is no specific PCRS allocation information in the DCI, the terminal may presume that the PCRS port $q_1=8$ having the same number as the first DMRS port $p_1=8$ included in the first DMRS group is allocated, and may also presume that the PCRS port $q_2=12$ having the same number as the first DMRS port $p_3=12$ included in the second DMRS group is allocated. Then the terminal may perform PCRS reception for the respective PCRS ports at the time and frequency resource locations corresponding to the RE mapping of the PCRS ports $q_1=8, q_2=12$. The terminal may perform the operations proposed in an embodiment on the assumption that the same precoding is applied to both the DMRS port $p_1=8$ and the PCRS port $q_1=8$. Also, the terminal may perform the operations proposed in an embodiment on the assumption that the same precoding is applied to both the DMRS port $p_3=12$ and the PCRS port $q_2=12$.

For example, it is presumed that the base station sets the DMRS port group as shown in Table 7 above. Thereafter, if the base station allocates the DMRS ports $(p_1, p_2, p_3, p_4)=(10, 11, 14, 15)$ to the terminal through one DCI, the terminal may know that the DMRS ports are included in different M' $(=2)$ DMRS port groups. In this case, the terminal knows that the first DMRS port group has $p_1, p_2$ and the second DMRS port group has $p_3, p_4$.

Even though there is no specific PCRS allocation information in the DCI, the terminal may presume that the PCRS port $q_1=10$ having the same number as the first DMRS port $p_1=10$ included in the first DMRS group is allocated, and may also presume that the PCRS port $q_2=14$ having the same number as the first DMRS port $p_3=14$ included in the second DMRS group is allocated. Then the terminal may perform PCRS reception for the respective PCRS ports at the time and frequency resource locations corresponding to the RE mapping of the PCRS ports $q_1=10, q_2=14$. The terminal may perform the operations based on the presumption that the same precoding is applied to both the DMRS port $p_1=10$ and the PCRS port $q_1=10$. Also, the terminal may perform the operations proposed in an embodiment on the presumption that the same precoding is applied to both the DMRS port $p_3=14$ and the PCRS port $q_2=14$.

Figure 4A:
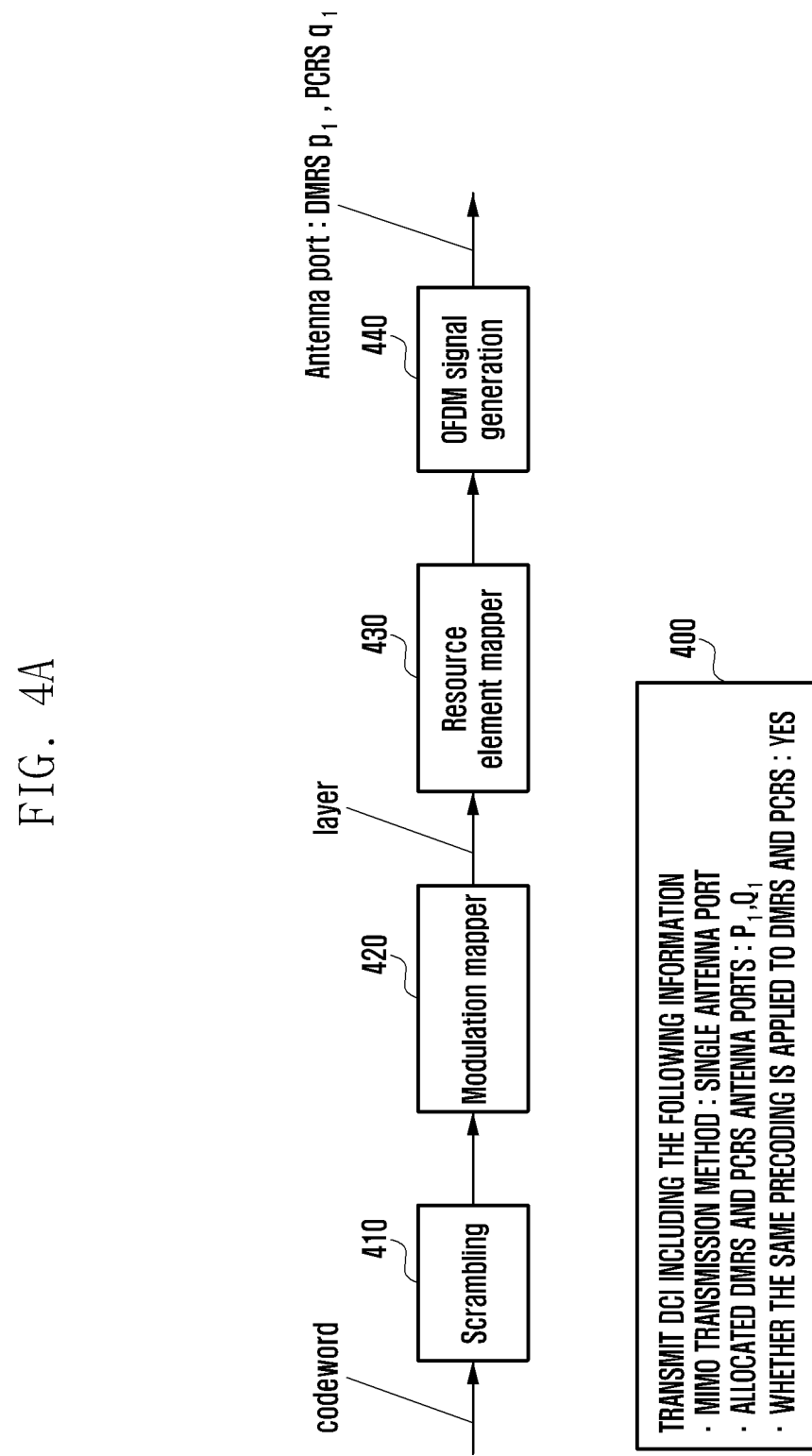
FIGS. 4A and 4B are diagrams illustrating operations of a base station and a terminal when the base station performs a signal transmission to the terminal by using a single antenna port according to various embodiments of the present disclosure.
Figure 4B:
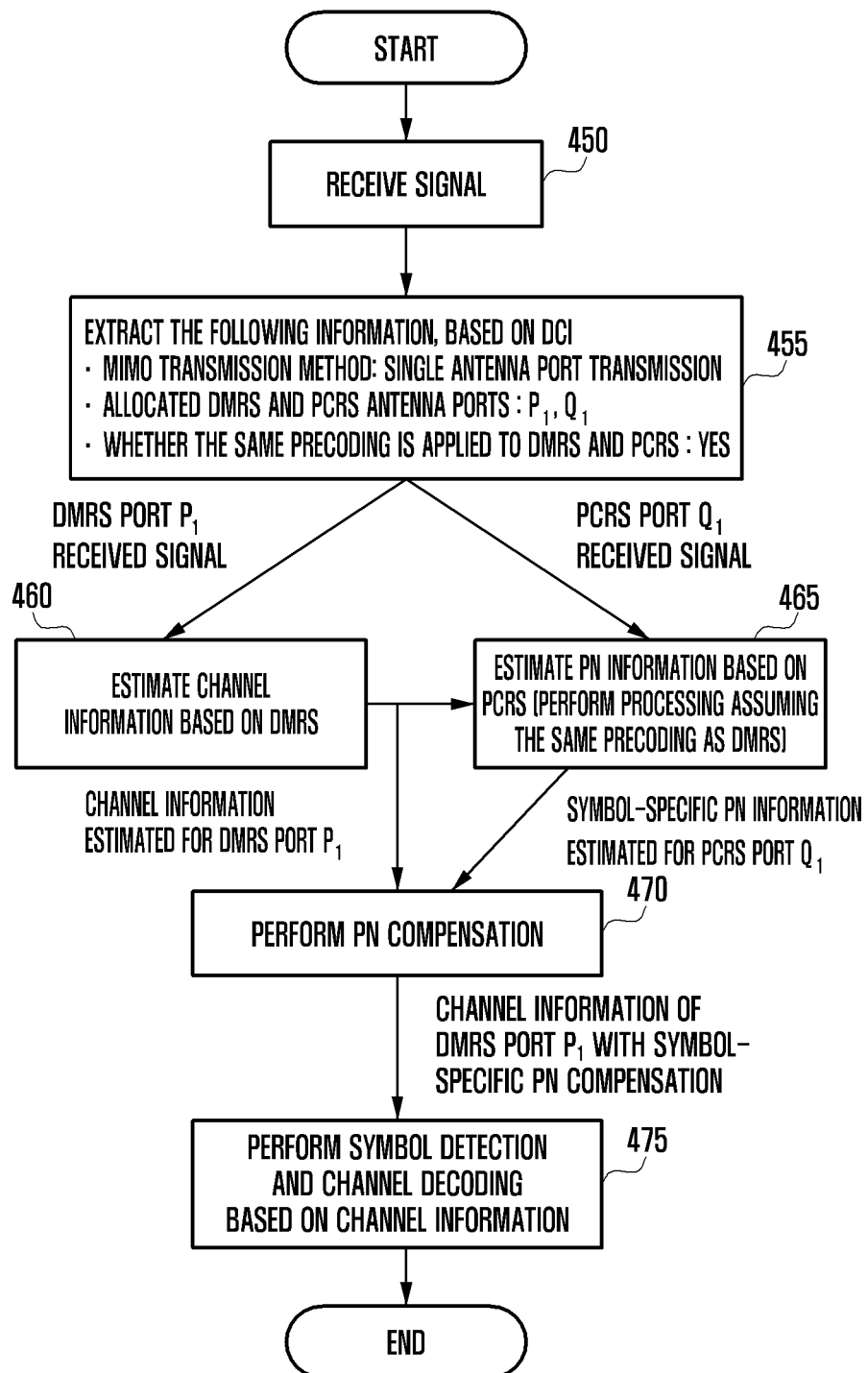

FIGS. 4A and 4B are diagrams illustrating operations of a base station and a terminal when the base station performs a signal transmission to the terminal by using a single antenna port according to various embodiments of the present disclosure.

Referring to FIG. 4A, operations of the base station are illustrated according to various embodiments of the present disclosure. At operation 400, the base station transmits, to the terminal, DCI including the following information. The DCI is for transmission using a single antenna port and includes one antenna port ($p_1$ in case of DMRS, $q_1$ in case of PCRS) of each of DMRS and PCRS allocated to the terminal, and information indicating whether the same precoding is applied to both reference signals, DMRS and PCRS. In this case, the same precoding is applied to antenna ports of both indicated reference signals.

According to another embodiment of the present disclosure, the information indicating whether the same precoding is applied to both reference signals may not be included in the DCI and may be set in advance through RRC signaling or MAC CE. Alternatively, the terminal may always presume that the same precoding is applied to both reference signals with respect to at least one or more antenna ports in accordance with embodiments of the present disclosure.

The allocation information for the PCRS port may not be explicitly included in the DCI. In this case, according to embodiments of the present disclosure, the terminal may implicitly obtain allocation information for the PCRS port.

Thereafter, the base station transmits downlink data to the terminal. At this time, the base station performs scrambling 410 and modulation mapping 420 for a codeword, performs RE mapping 430 of a modulated symbol of one layer associated with an antenna port, perform OFDM signal generation 440 and transmits the OFDM signal. At this time, the base station transmits DMRS and PCRS together with the data, and both reference signals are transmitted with antenna port numbers indicated by the DCI. The antenna port numbers of both reference signals may be the same.

Referring to FIG. 4B, operations of the terminal are illustrated according to various embodiments of the present disclosure. At operation 450, the terminal receives a signal (data) from the base station and extracts, at operation 455, information on a transmission method, DMRS and PCRS antenna ports, and information indicating whether the same precoding is applied, based on the DCI received previously. Then, the terminal estimates channel information based on the DMRS at operation 460, and also estimates phase noise (PN) information based on the PCRS at operation 465. At this time, the terminal processes the PCRS by assuming that the same precoding is applied to both DMRS and PCRS. Then, the terminal performs phase noise compensation based on the channel information and the phase noise information at operation 470, and performs a symbol detection and channel decoding based on channel information with the compensated phase noise at operation 475. The operations 465 and 470 may be performed based on the methods discussed above in an embodiment.

Figure 5A:
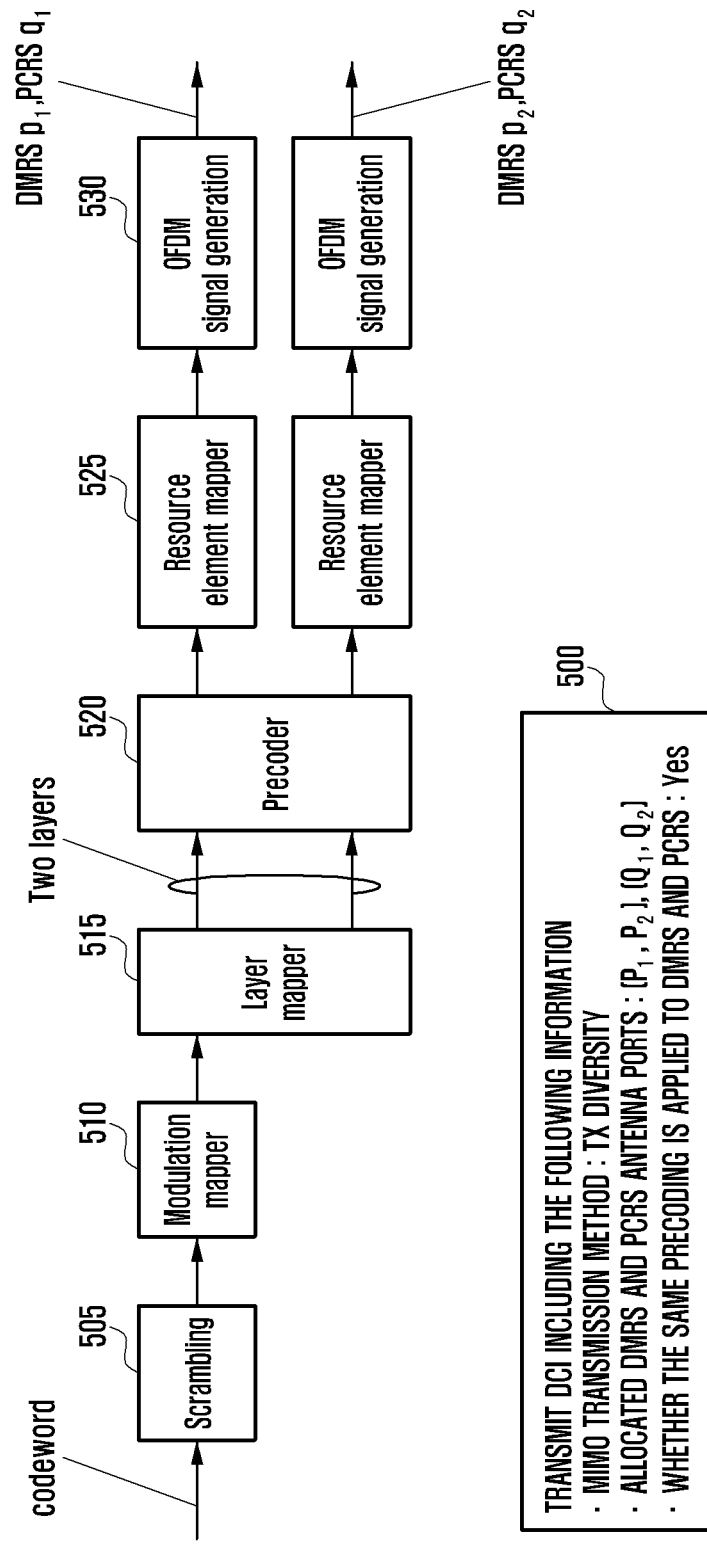
FIGS. 5A and 5B are diagrams illustrating operations of a base station and a terminal when the base station performs a signal transmission to the terminal by using a transmit diversity according to various embodiments of the present disclosure.
Figure 5B:
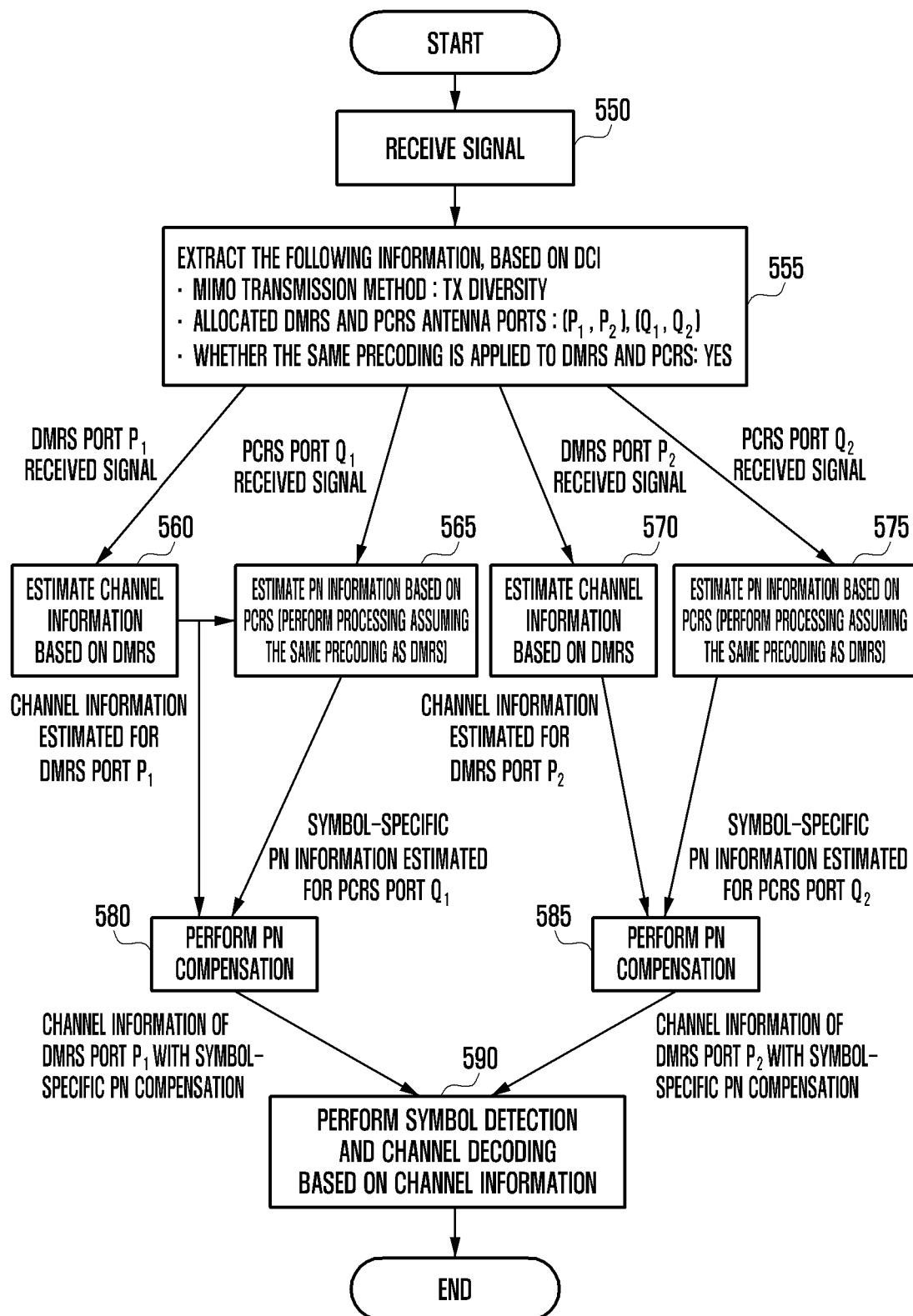

FIGS. 5A and 5B are diagrams illustrating operations of a base station and a terminal when the base station performs a signal transmission to the terminal by using a transmit diversity according to various embodiments of the present disclosure.

Referring to FIG. 5A, operations of the base station are illustrated. At operation 500, the base station transmits, to the terminal, DCI including the following information. The DCI is for transmission using a transmit diversity and includes two antenna ports ($p_1$, $p_2$ in case of DMRS, $q_1$, $q_2$ in case of PCRS) of each of DMRS and PCRS allocated to the terminal, and information indicating whether the same precoding is applied to both reference signals, DMRS and PCRS. In this case, the same precoding is applied to both DMRS and PCRS having the same antenna port number. Namely, the same precoding is applied to both $p_1$ and $q_1$, and the same precoding is applied to both $p_2$ and $q_2$.

According to another embodiment of the present disclosure, the information indicating whether the same precoding is applied to both reference signals may not be included in the DCI and may be set in advance through RRC signaling or MAC CE. Alternatively, the terminal may always presume that the same precoding is applied to both reference signals with respect to at least one or more antenna ports in accordance with embodiments of the present disclosure.

The allocation information for the PCRS port may not be explicitly included in the DCI. In this case, according to embodiments of the present disclosure, the terminal may implicitly obtain allocation information for the PCRS port.

Thereafter, the base station transmits downlink data to the terminal. At this time, the base station performs scrambling 505 and modulation mapping 510 for one codeword, performs layer mapping 515 of a modulated symbol to two layers, and applies precoding 520 based on the transmit diversity to the symbol mapped to the layers. Then, the base station performs RE mapping 525 of the precoded symbol associated with each of two antenna ports, generates the OFDM signal 530, and transmits the OFDM signal. At this time, the base station transmits DMRS and PCRS together with the data, and both reference signals are transmitted using antenna port numbers indicated by the DCI. The antenna port numbers of both reference signals having the same precoding may be the same (namely, $p_1=q_1$, $p_2=q_2$).

Referring to FIG. 5B, operations of the terminal are illustrated. At operation 550, the terminal receives a signal (data) from the base station and extracts, at operation 555, information on a transmission method, DMRS and PCRS antenna ports, and information indicating whether the same precoding is applied, based on the DCI. Then, the terminal estimates channel information based on the DMRS port $p_1$ at operation 560, and also estimates PN information based on the PCRS port $q_1$ at operation 565. At this time, the terminal processes the PCRS by presuming that the same precoding is applied to both DMRS and PCRS. In addition, the terminal estimates channel information based on the DMRS port $p_2$ at operation 570, and also estimates phase noise information based on the PCRS port $q_2$ at operation 575. At this time, the terminal processes the PCRS by presuming that the same precoding is applied to both DMRS and PCRS. Then, the terminal performs phase noise compensation based on the channel information estimated based on the DMRS port $p_1$ and the phase noise information estimated based on the PCRS port $q_1$ at operation 580, performs phase noise compensation based on the channel information estimated based on the DMRS port $p_2$ and the phase noise information estimated based on the PCRS port $q_2$ at operation 585, and performs a symbol detection and channel decoding based on channel information with the compensated phase noise at operation 590. The operations 565, 580, 575 and 585 may be performed based on the methods discussed above in an embodiment.

Figure 6A:
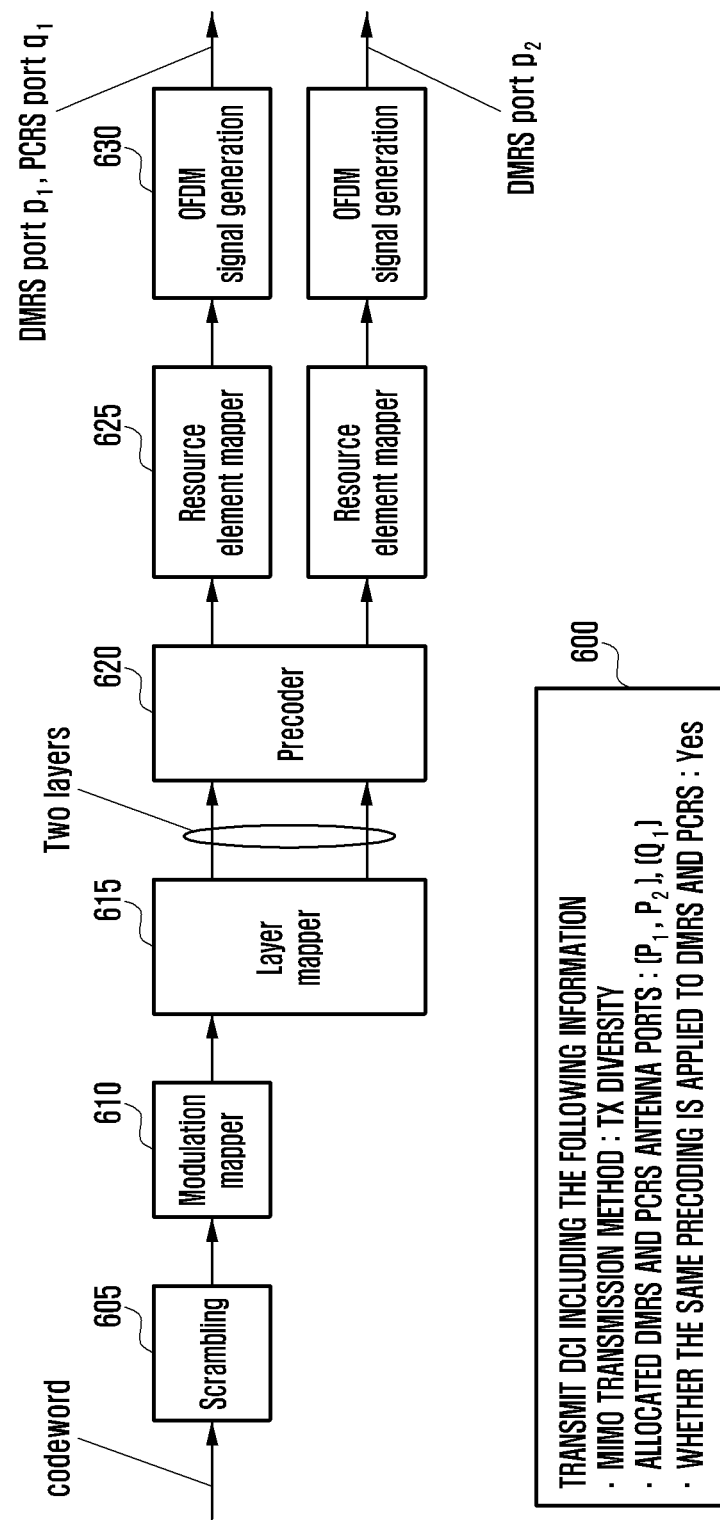
FIGS. 6A and 6B are diagrams illustrating operations of a base station and a terminal when the base station performs a signal transmission to the terminal by using a transmit diversity according to various embodiments of the present disclosure.
Figure 6B:
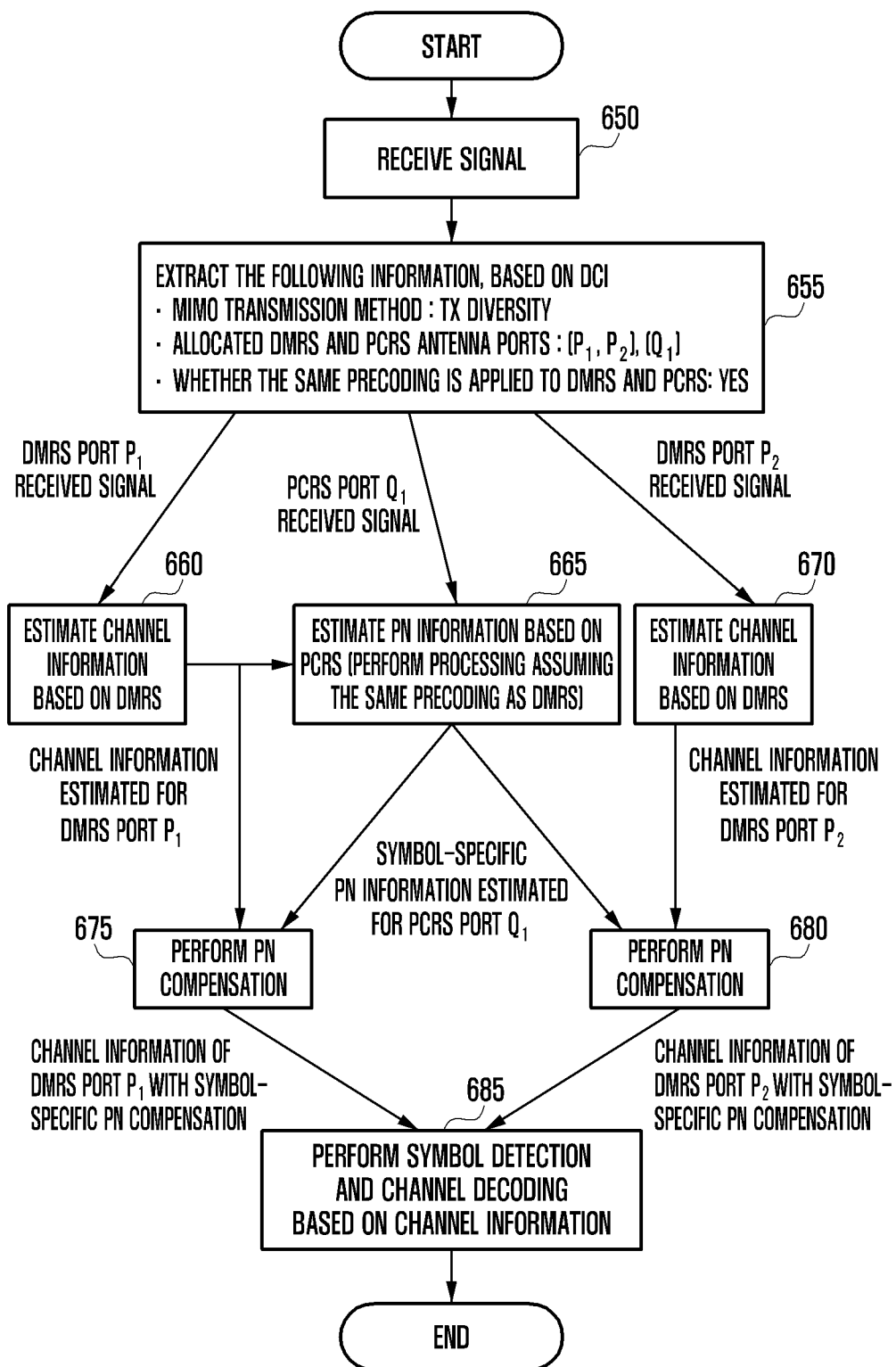

FIGS. 6A and 6B are diagrams illustrating operations of a base station and a terminal when the base station performs a signal transmission to the terminal by using a transmit diversity according to various embodiments of the present disclosure.

Referring to FIG. 6A, operations of the base station are illustrated. At operation 600, the base station transmits, to the terminal, DCI including the following information. The DCI is for transmission using a transmit diversity and includes two DMRS antenna ports $p_1$, $p_2$ and one PCRS antenna port $q_1$ allocated to the terminal, and information indicating whether the same precoding is applied to both reference signals, DMRS and PCRS. In this case, according to embodiments of the present disclosure, the same precoding is applied to both the DMRS port $p_1$ and the PCRS port $q_1$.

According to another embodiment of the present disclosure, the information indicating whether the same precoding is applied to both reference signals may not be included in the DCI and may be set in advance through RRC signaling or MAC CE. Alternatively, the terminal may always presume that the same precoding is applied to both reference signals with respect to at least one or more antenna ports in accordance with embodiments of the present disclosure.

The allocation information for the PCRS port may not be explicitly included in the DCI. In this case, according to embodiments of the present disclosure, the terminal may implicitly obtain allocation information for the PCRS port.

Thereafter, the base station transmits downlink data to the terminal. At this time, the base station performs scrambling 605 and modulation mapping 610 for one codeword, performs layer mapping 615 of a modulated symbol to two layers, and applies precoding 620 based on the transmit diversity to the symbol mapped to the layers. Then, the base station performs RE mapping 625 of the precoded symbol associated with each antenna port, generates an OFDM signal 630, and transmits the OFDM signal. At this time, the base station transmits DMRS and PCRS together with the data, and both reference signals are transmitted using antenna port numbers indicated by the DCI. At this time, one layer is transmitted together with the DMRS port $p_1$ and the PCRS port $q_1$, and the other layer is transmitted together with the DMRS port $p_2$. The antenna port numbers of both reference signals having the same precoding may be the same (namely, $p_1=q_1$).

Referring to FIG. 6B, operations of the terminal are illustrated. At operation 650, the terminal receives a signal (data) from the base station and extracts, at operation 655, information on a transmission method, DMRS and PCRS antenna ports, and information indicating whether the same precoding is applied, based on the DCI received previously. Then, the terminal estimates channel information based on the DMRS port $p_1$ at operation 660, and also estimates PN information based on the PCRS port $q_1$ at operation 665. At this time, the terminal processes the PCRS by assuming that the same precoding is applied to both DMRS and PCRS. In addition, the terminal estimates channel information based on the DMRS port $p_2$ at operation 670. Then, the terminal performs phase noise compensation based on the channel information estimated based on the DMRS port $p_1$ and the phase noise information estimated based on the PCRS port $q_1$ at operation 675, performs phase noise compensation based on the channel information estimated based on the DMRS port $p_2$ and the phase noise information estimated based on the PCRS port $q_1$ at operation 680, and performs a symbol detection and channel decoding based on channel information with the compensated phase noise at operation 685. The operations 665, 675 and 680 may be performed based on the methods discussed above in an embodiment.

Figure 7A:
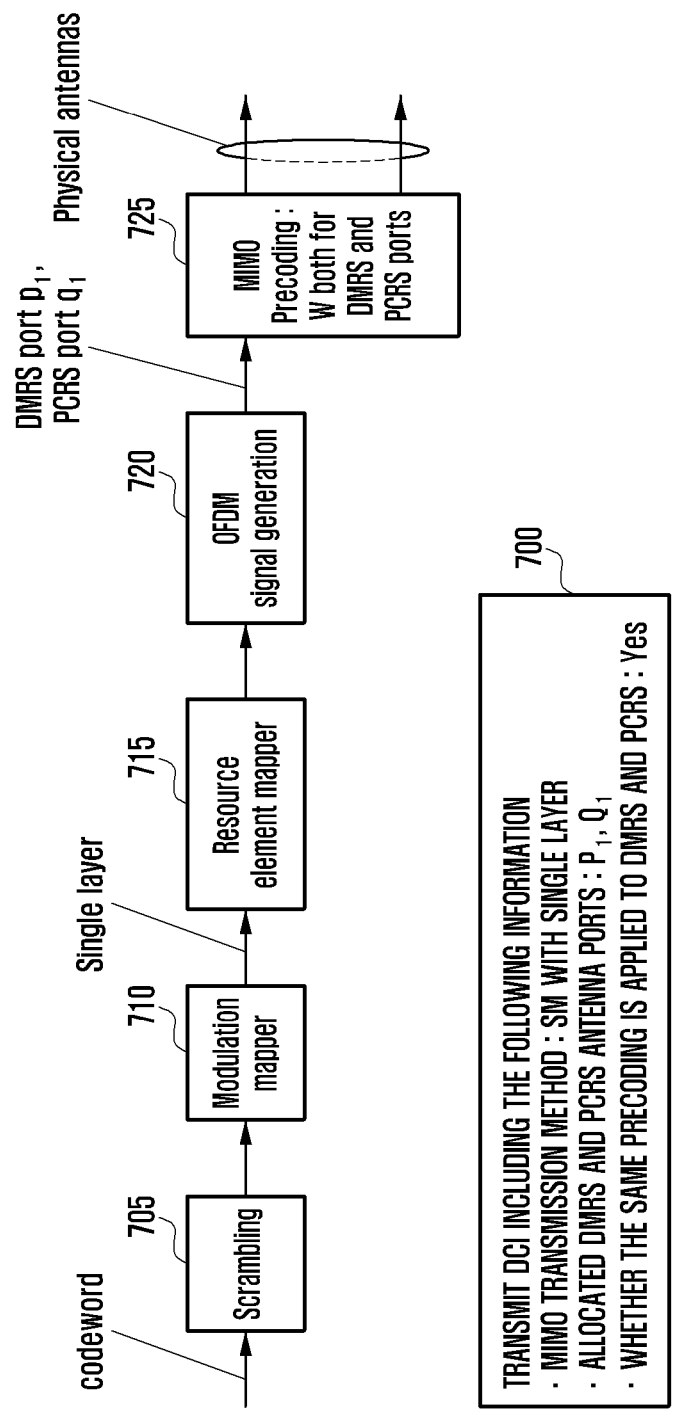
FIGS. 7A and 7B are diagrams illustrating operations of a base station and a terminal when the base station performs a signal transmission to the terminal by using a spatial multiplexing with a single layer according to various embodiments of the present disclosure.
Figure 7B:
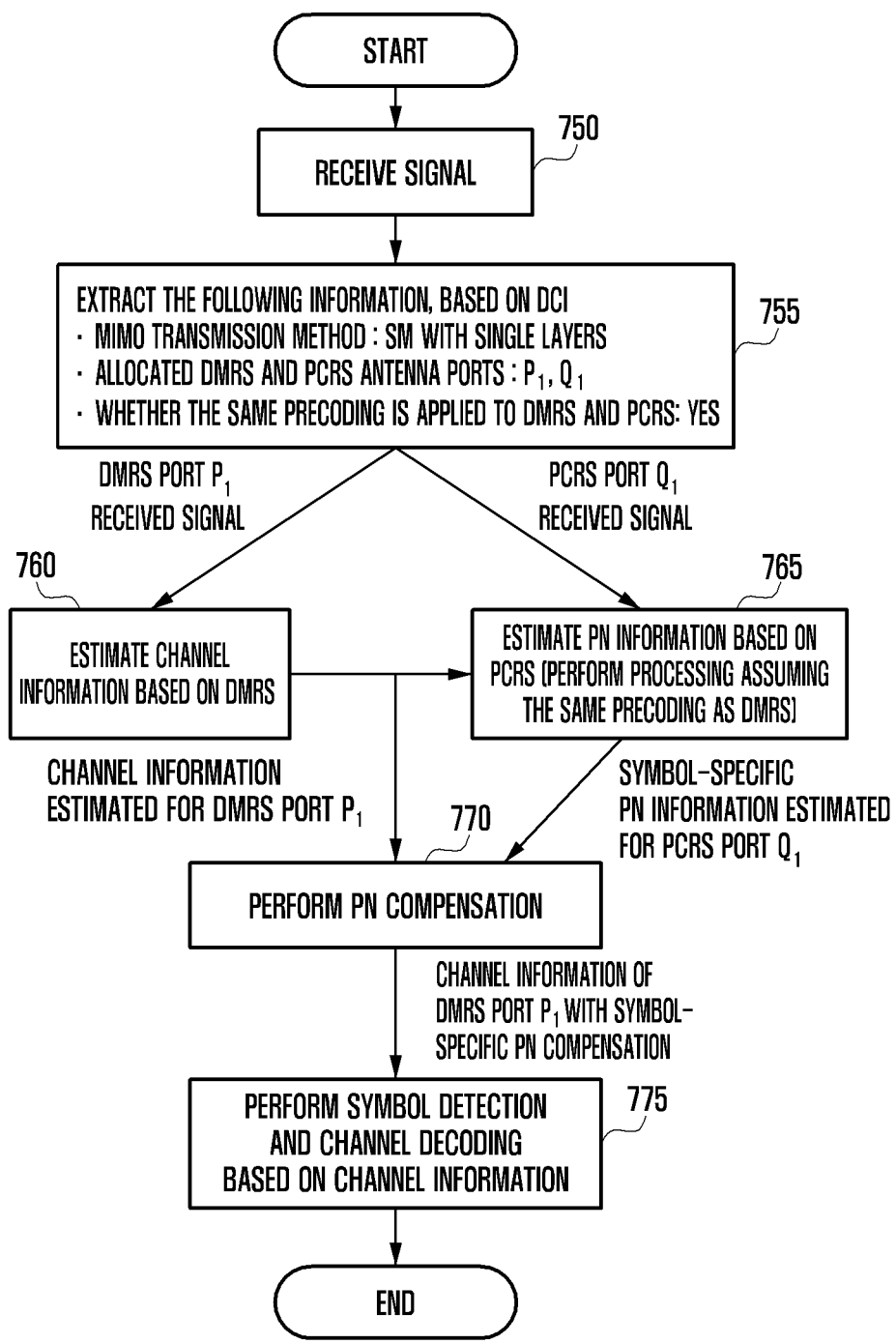

FIGS. 7A and 7B are diagrams illustrating operations of a base station and a terminal when the base station performs a signal transmission to the terminal by using a spatial multiplexing with a single layer according to various embodiments of the present disclosure.

FIG. 7A shows the operations of the base station. Referring to FIG. 7A, at operation 700, the base station transmits, to the terminal, DCI including the following information. The DCI is for transmission using a spatial multiplexing (SM) and includes one DMRS antenna port $p_1$ and one PCRS antenna port $q_1$ allocated to the terminal, and information indicating whether the same precoding is applied to both reference signals, DMRS and PCRS. In this case, the same precoding is applied to both the DMRS antenna port $p_1$ and the PCRS antenna port $q_1$.

According to another embodiment of the present disclosure, the information indicating whether the same precoding is applied to both reference signals may not be included in the DCI and may be set in advance through RRC signaling or MAC CE. Alternatively, the terminal may always presume that the same precoding is applied to both reference signals with respect to at least one or more antenna ports in accordance with embodiments of the present disclosure.

The allocation information for the PCRS port may not be explicitly included in the DCI. In this case, according to embodiments of the present disclosure, the terminal may implicitly obtain allocation information for the PCRS port.

Thereafter, the base station transmits downlink data to the terminal. At this time, the base station performs scrambling 705 and modulation mapping 710 for one codeword, performs resource element mapping 715 of a modulated symbol of one layer, generates an OFDM signal 720 from the symbol, and applies the same precoding 725 to both DMRS and PCRS (e.g., W is applied to both the DMRS and PCRS), and transmits using a plurality of physical antennas. At this time, the base station transmits DMRS and PCRS together with the data, using the DMRS antenna port $p_1$ and the PCRS antenna port $q_1$. The antenna port numbers of both reference signals having the same precoding may be the same (namely, $p_1=q_1$).

Referring to FIG. 7B, operations of the terminal are illustrated. At operation 750, the terminal receives a signal (data) from the base station and extracts, at operation 755, information on a transmission method, DMRS and PCRS antenna ports, and information indicating whether the same precoding is applied, based on the DCI. Then, the terminal estimates channel information based on the DMRS port $p_1$ at operation 760, and also estimates PN information based on the PCRS port $q_1$ at operation 765. At this time, the terminal processes the PCRS by assuming that the same precoding is applied to both DMRS and PCRS. Then, the terminal performs phase noise compensation based on the channel information estimated based on the DMRS port $p_1$ and the phase noise information estimated based on the PCRS port $q_1$ at operation 770, and performs a symbol detection and channel decoding based on channel information with the compensated phase noise at operation 775. The operations 765 and 770 may be performed based on the methods discussed above in an embodiment.

Figure 8A:
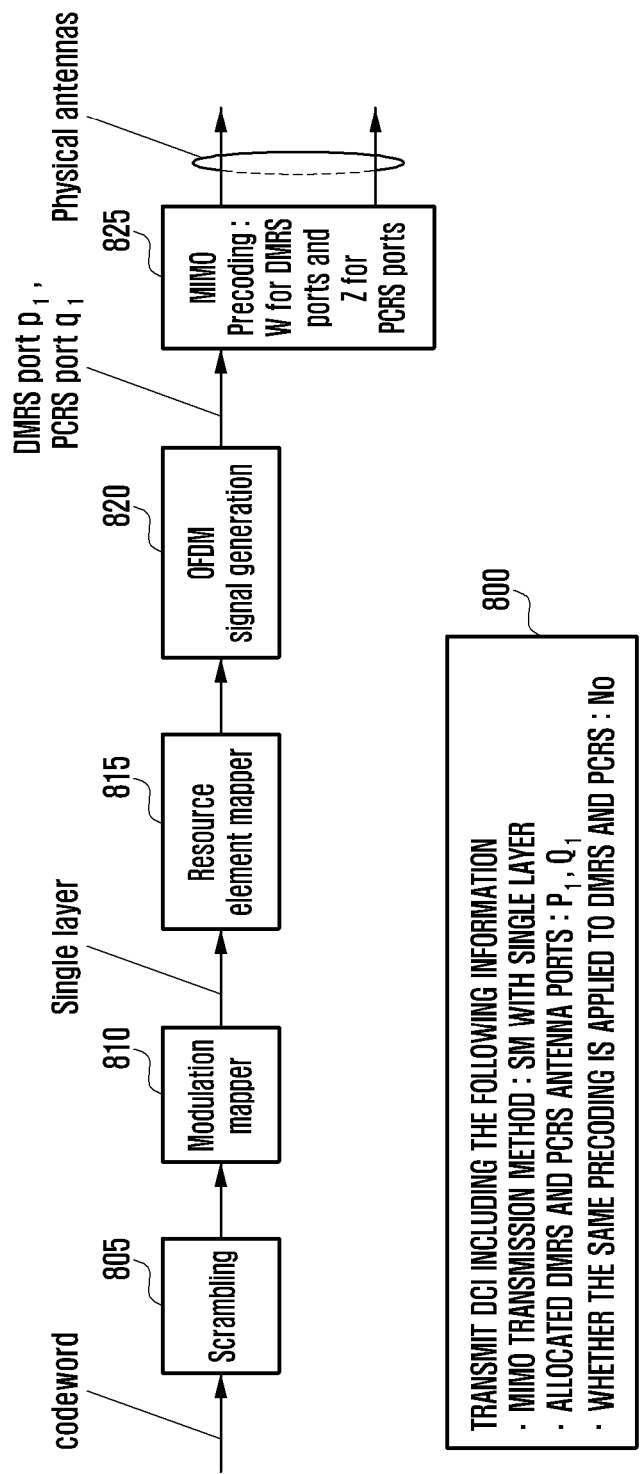
FIGS. 8A and 8B are diagrams illustrating operations of a base station and a terminal when the base station performs a signal transmission to the terminal by using a spatial multiplexing with a single layer according to various embodiments of the present disclosure.
Figure 8B:
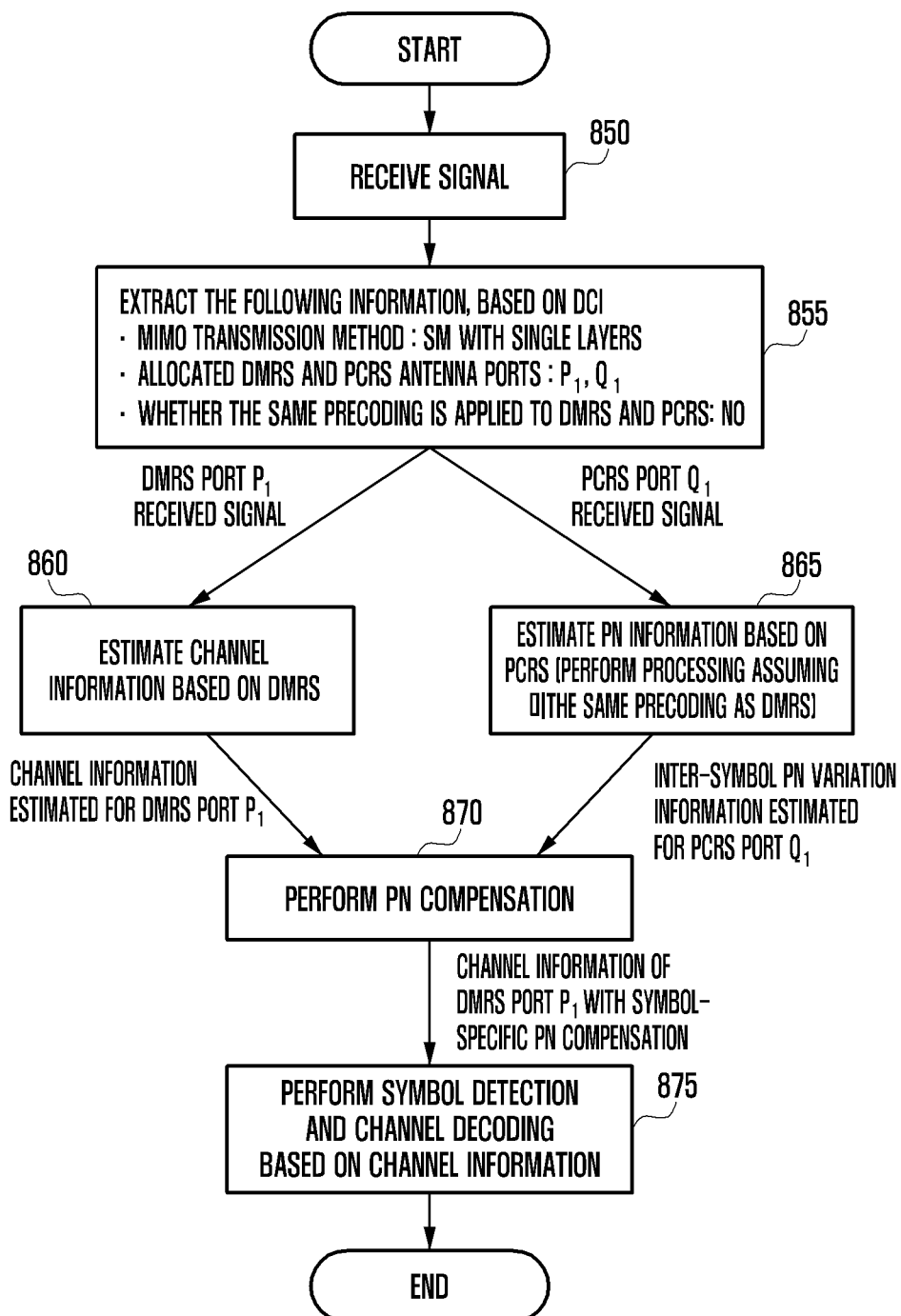

FIGS. 8A and 8B are diagrams illustrating operations of a base station and a terminal when the base station performs a signal transmission to the terminal by using a spatial multiplexing with a single layer according to various embodiments of the present disclosure.

Referring to FIG. 8A, operations of the base station are illustrated and are different from FIGS. 7A and 7B in that different precoders are applied to DMRS and PCRS. At operation 800, the base station transmits, to the terminal, DCI including the following information. The DCI is for transmission using a spatial multiplexing and includes one DMRS antenna port $p_1$ and one PCRS antenna port $q_1$ allocated to the terminal, and information indicating whether the same precoding is applied to both reference signals, DMRS and PCRS. In this case, the same precoding is not applied to both DMRS and PCRS.

Thereafter, the base station transmits downlink data to the terminal. At this time, the base station performs scrambling 805 and modulation mapping 810 for one codeword, performs RE mapping 815 of a modulated symbol of one layer, generates an OFDM signal 820 from the symbol, and applies different precodings 825 to both DMRS and PCRS (e.g., W is applied to DMRS ports and Z is applied to PCRS ports) using a plurality of physical antennas, and transmits data. At this time, the base station transmits DMRS and PCRS together with the data, using the DMRS antenna port $p_1$ and the PCRS antenna port $q_1$.

Referring to FIG. 8B, operations of the terminal are illustrated. At operation 850 the terminal receives a signal (i.e., data) from the base station and extracts, at operation 855, information on a transmission method, DMRS and PCRS antenna ports, and information indicating whether the same precoding is applied, based on the DCI. Then, the terminal estimates channel information based on the DMRS port $p_1$ at operation 860, and also estimates PN information based on the PCRS port $q_1$ at operation 865. At this time, the terminal processes the PCRS by presuming that the same precoding is not applied to both DMRS and PCRS. Then, the terminal performs phase noise compensation based on the channel information estimated based on the DMRS port $p_1$ and the phase noise information estimated based on the PCRS port $q_1$ at operation 870, and performs a symbol detection and channel decoding based on channel information with the compensated phase noise at operation 875. The operations 865 and 870 may be performed based on the methods discussed above in an embodiment.

Figure 9A:
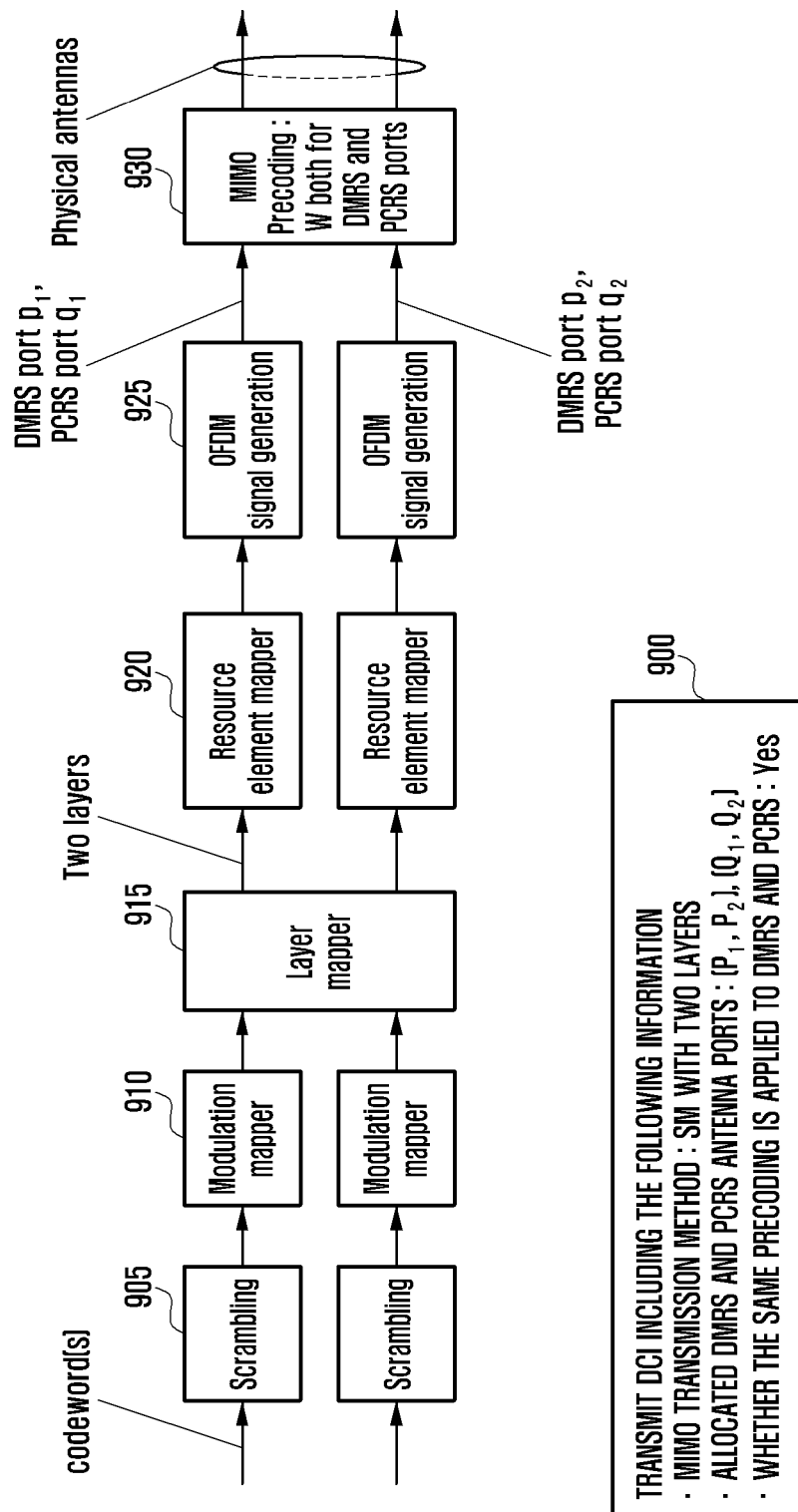
FIGS. 9A and 9B are diagrams illustrating operations of a base station and a terminal when the base station performs a signal transmission to the terminal by using a spatial multiplexing with two layers according to various embodiments of the present disclosure.
Figure 9B:
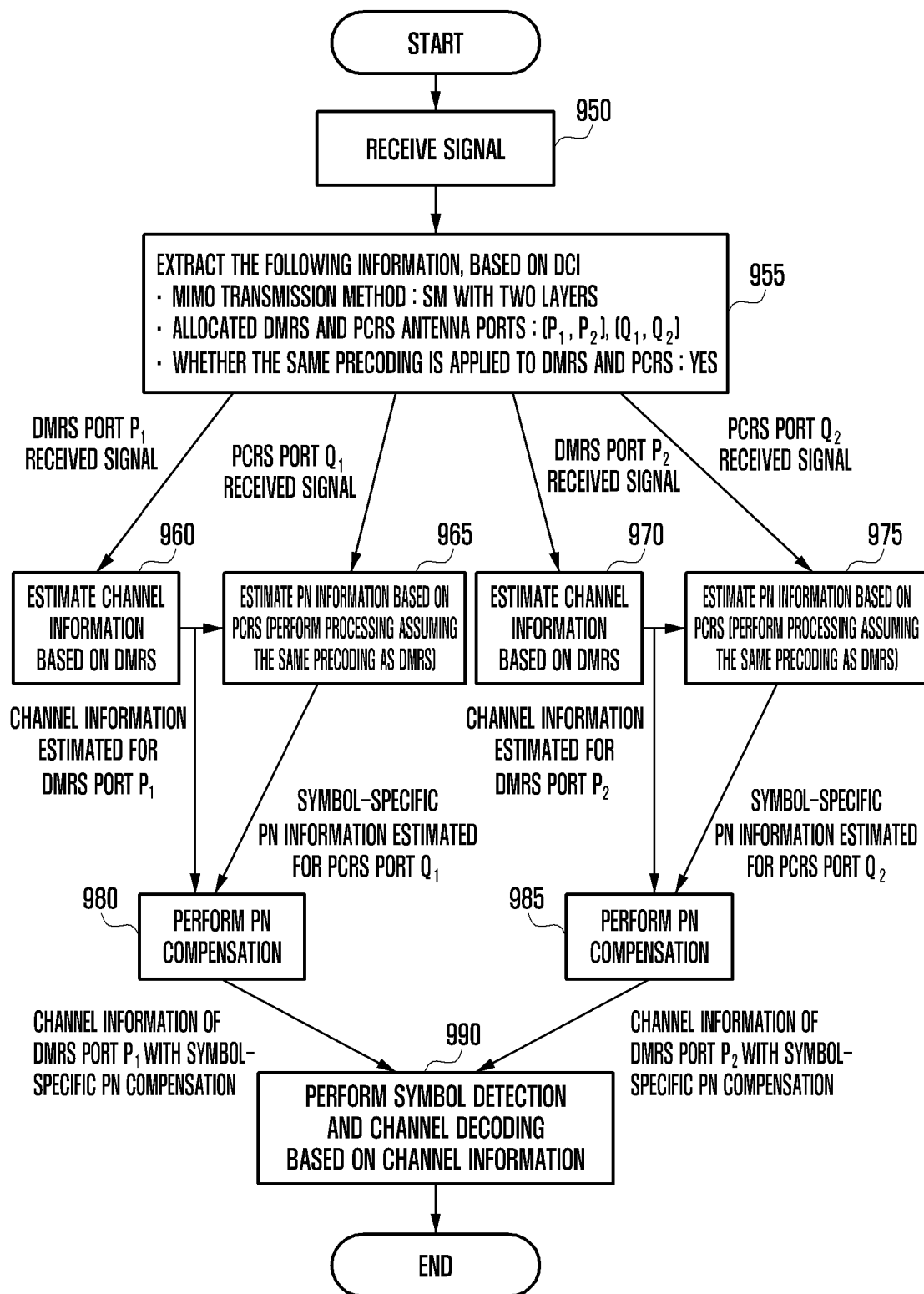

FIGS. 9A and 9B are diagrams illustrating operations of a base station and a terminal when the base station performs a signal transmission to the terminal by using a spatial multiplexing with two layers according to various embodiments of the present disclosure.

Referring to FIG. 9A, operations of the base station are illustrated. At operation 900, the base station transmits, to the terminal, DCI including the following information. The DCI is for transmission using SM and includes two antenna ports ($p_1$, $p_2$ in case of DMRS, $q_1$, $q_2$ in case of PCRS) of each of DMRS and PCRS allocated to the terminal, and information indicating whether the same precoding is applied to both reference signals, DMRS and PCRS. In this case, the same precoding is applied to both DMRS and PCRS having the same antenna port number. Namely, the same precoding is applied to both $p_1$ and $q_1$, and the same precoding is applied to both $p_2$ and $q_2$.

According to another embodiment of the present disclosure, the information indicating whether the same precoding is applied to both reference signals may not be included in the DCI and may be set in advance through RRC signaling or MAC CE. Alternatively, the terminal may always presume that the same precoding is applied to both reference signals with respect to at least one or more antenna ports in accordance with embodiments of the present disclosure.

The allocation information for the PCRS port may not be explicitly included in the DCI. In this case, according to embodiments of the present disclosure, the terminal may implicitly obtain allocation information for the PCRS port.

Thereafter, the base station transmits downlink data to the terminal. At this time, the base station performs scrambling 905 and modulation mapping 910 for each of two codewords, performs layer mapping 915 of a modulated symbol to each of two layers, performs RE mapping 920 of the layer-mapped symbol associated with each of two antenna ports, generates an OFDM signal 925 from the symbol, applies the same precoding 930 to the associated DMRS and PCRS (e.g., W is applied to both the DMRS and PCRS), and transmits using a plurality of physical antennas. At this time, the base station transmits DMRS and PCRS together with the data, and both reference signals are transmitted using two antenna ports indicated by the DCI. The antenna port numbers of both reference signals having the same precoding may be the same (namely, $p_1=q_1$, $p_2=q_2$).

Referring to FIG. 9B, operations of the terminal are illustrated. At operation 950, the terminal receives a signal (data) from the base station and extracts, at operation 955, information on a transmission method, DMRS and PCRS antenna ports, and information indicating whether the same precoding is applied, based on the DCI received previously. Then, the terminal estimates channel information based on the DMRS port $p_1$ at operation 960, and also estimates PN information based on the PCRS port $q_1$ at operation 965. At this time, the terminal processes the PCRS by assuming that the same precoding is applied to both DMRS and PCRS. In addition, the terminal estimates channel information based on the DMRS port $p_2$ at operation 970, and also estimates phase noise information based on the PCRS port $q_2$ at operation 975. At this time, the terminal processes the PCRS by presuming that the same precoding is applied to both DMRS and PCRS. Then, the terminal performs phase noise compensation based on the channel information estimated based on the DMRS port $p_1$ and the phase noise information estimated based on the PCRS port $q_1$ at operation 980, performs phase noise compensation based on the channel information estimated based on the DMRS port $p_2$ and the phase noise information estimated based on the PCRS port $q_2$ at operation 985, and performs a symbol detection and channel decoding based on channel information with the compensated phase noise at operation 990. The operations 965, 975, 980 and 985 may be performed based on the methods discussed above in an embodiment.

Figure 10A:
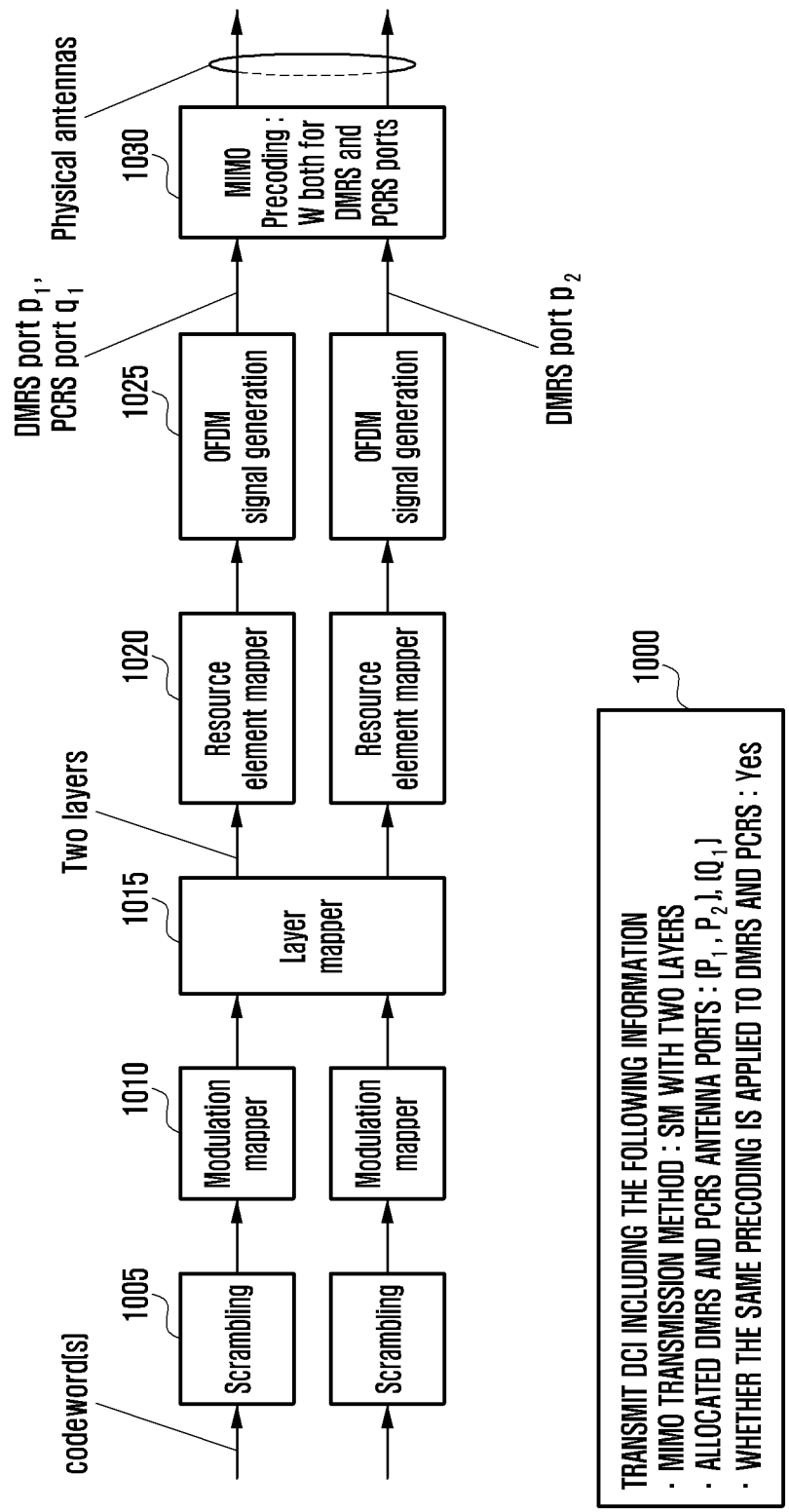
FIGS. 10A and 10B are diagrams illustrating operations of a base station and a terminal when the base station performs a signal transmission to the terminal by using a spatial multiplexing with two layers according to various embodiments of the present disclosure.
Figure 10B:
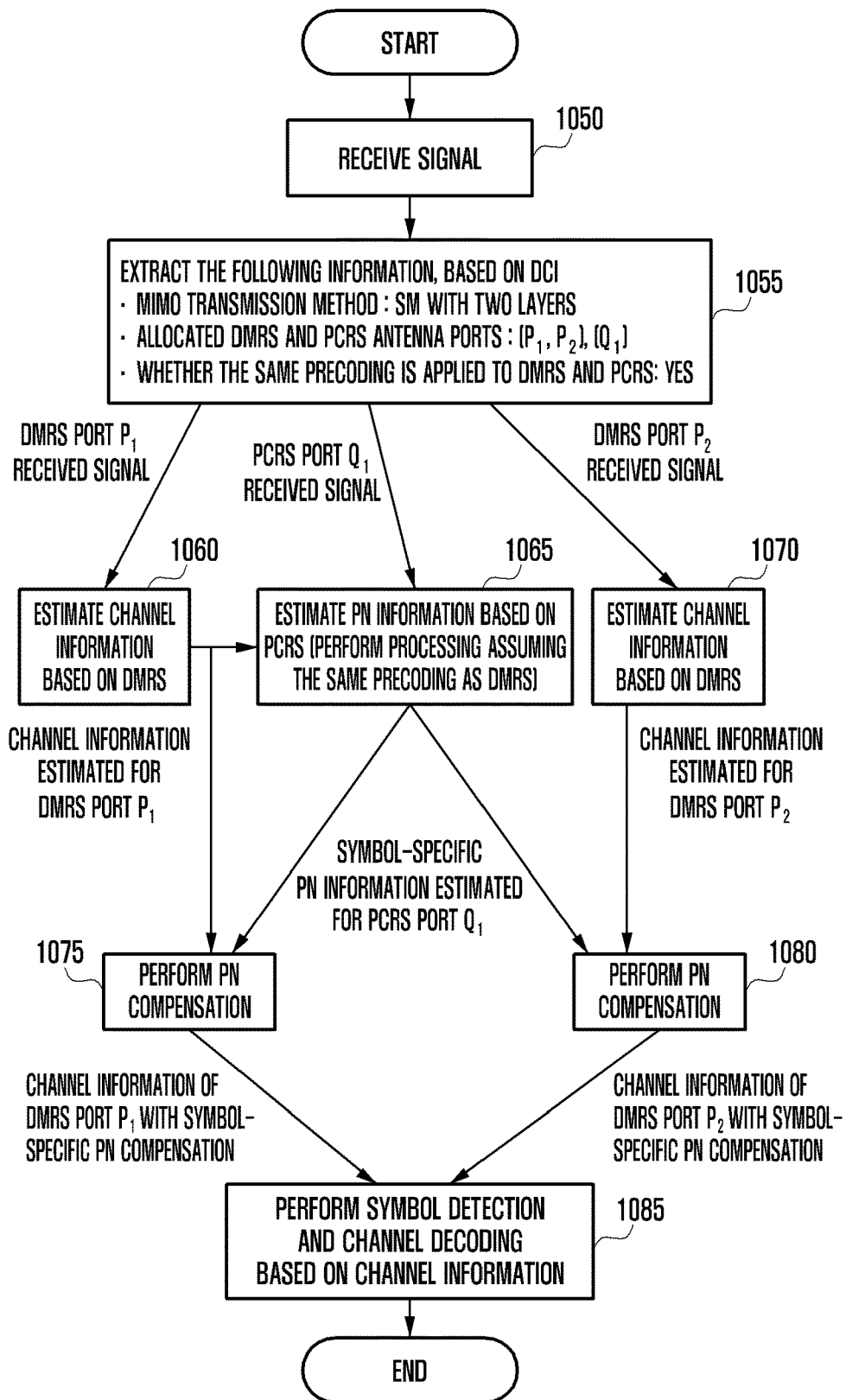

FIGS. 10A and 10B are diagrams illustrating operations of a base station and a terminal when the base station performs a signal transmission by using a spatial multiplexing with two layers according to various embedment of the present disclosure.

Referring to FIG. 10A, operations of the base station are illustrated and differ from the example in FIGS. 9A and 9B in that two DMRS ports and one PCRS port are allocated. At operation 1000, the base station transmits, to the terminal, DCI including the following information. The DCI is for transmission using a spatial multiplexing and includes DMRS and PCRS antenna ports ($p_1$, $p_2$ in case of DMRS, $q_1$ in case of PCRS) allocated to the terminal, and information indicating whether the same precoding is applied to both reference signals, DMRS and PCRS. In this case, the same precoding is applied to both DMRS and PCRS having the same antenna port number. Namely, the same precoding is applied to both $p_1$ and $q_1$.

According to another embodiment of the present disclosure, the information indicating whether the same precoding is applied to both reference signals may not be included in the DCI and may be set in advance through RRC signaling or MAC CE. Alternatively, the terminal may always presume that the same precoding is applied to both reference signals with respect to at least one or more antenna ports in accordance with embodiments of the present disclosure.

The allocation information for the PCRS port may not be explicitly included in the DCI. In this case, according to embodiments of the present disclosure, the terminal may implicitly obtain allocation information for the PCRS port.

Thereafter, the base station transmits downlink data to the terminal. At this time, the base station performs scrambling 1005 and modulation 1010 for each of two codewords, performs layer mapping 1015 of a modulated symbol to each of two layers, performs RE mapping 1020 of the layer-mapped symbol associated with each antenna port, generates an OFDM signal 1025 from the symbol, applies the same precoding 1030 to the associated DMRS and PCRS (e.g., W is applied to both DMRS and PCRS ports), and transmits using a plurality of physical antennas. At this time, the base station transmits DMRS and PCRS together with the data. At this time, one layer is transmitted together with the DMRS port $p_1$ and the PCRS port $q_1$, and the other layer is transmitted together with the DMRS port $p_2$. The antenna port numbers of both reference signals having the same precoding may be the same (namely, $p_1=q_1$).

Referring to FIG. 10B, operations of the terminal are illustrated. At operation 1050, the terminal receives a signal (data) from the base station and extracts, at operation 1055, information on a transmission method, DMRS and PCRS antenna ports, and information indicating whether the same precoding is applied, based on the DCI. Then, the terminal estimates channel information based on the DMRS port $p_1$ at operation 1060, and also estimates PN information based on the PCRS port $q_1$ at operation 1065. At this time, the terminal processes the PCRS by assuming that the same precoding is applied to both DMRS and PCRS. In addition, the terminal estimates channel information based on the DMRS port $p_2$ at operation 1070. Then, the terminal performs phase noise compensation based on the channel information estimated based on the DMRS port $p_1$ and the phase noise information estimated based on the PCRS port $q_1$ at operation 1075, performs phase noise compensation based on the channel information estimated based on the DMRS port $p_2$ and the phase noise information estimated based on the PCRS port $q_1$ at operation 1080, and performs a symbol detection and channel decoding based on channel information with the compensated phase noise at operation 1085. The operations 1065, 1075 and 1080 may be performed based on the methods discussed above in an embodiment.

Figure 11A:
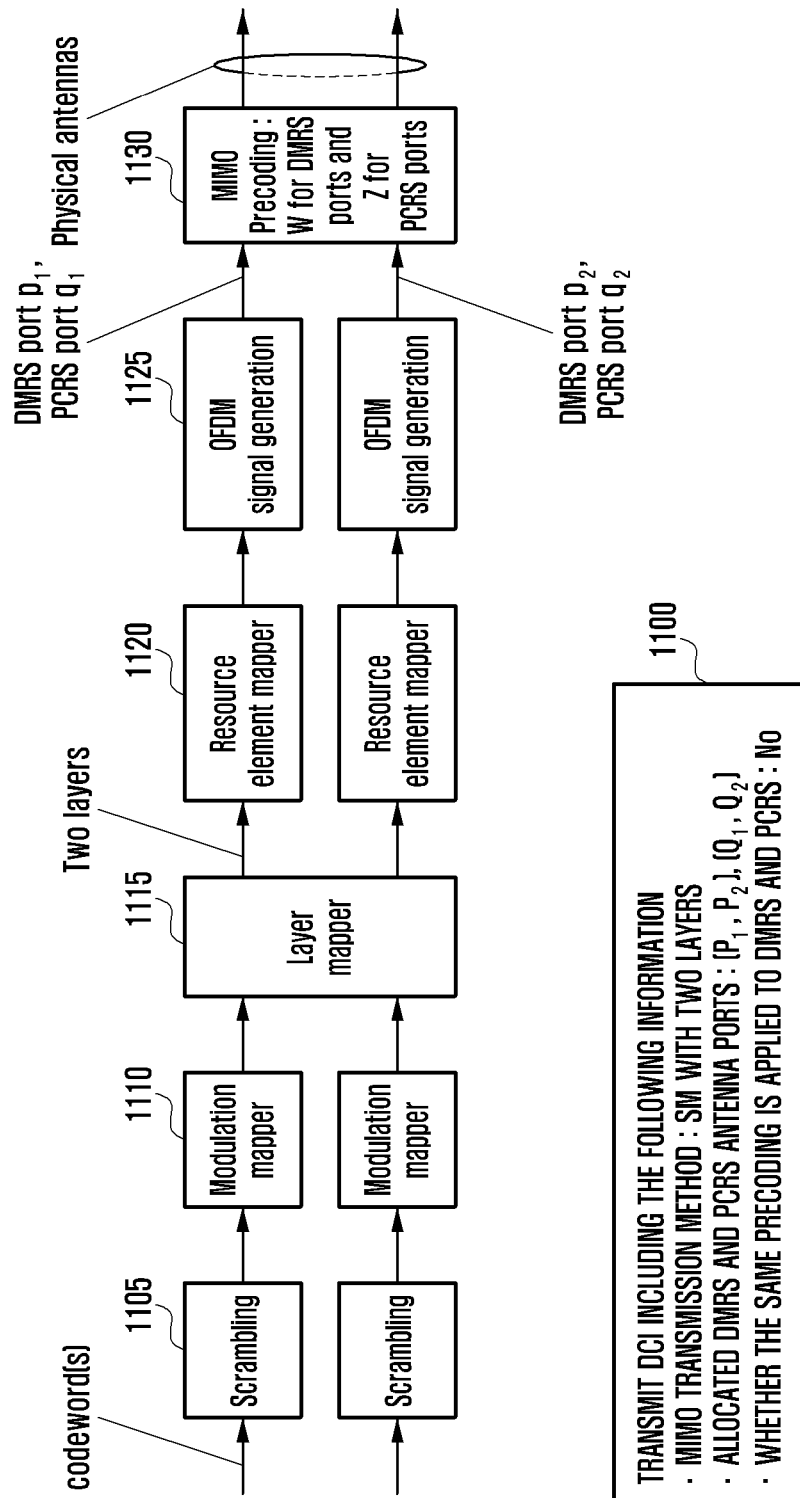
FIGS. 11A and 11B are diagrams illustrating operations of a base station and a terminal when the base station performs a signal transmission to the terminal by using a spatial multiplexing with two layers according to various embodiments of the present disclosure.
Figure 11B:
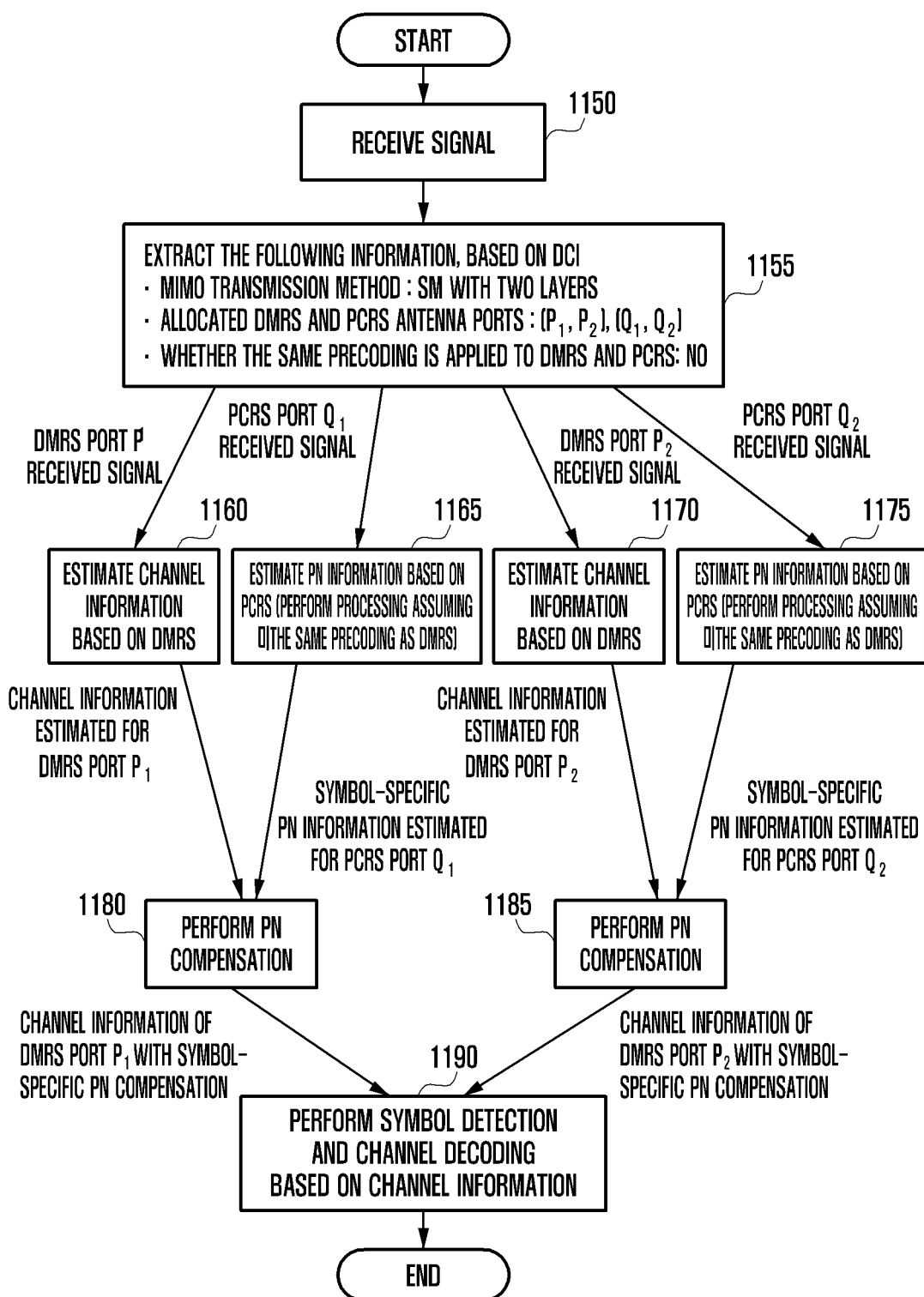

FIGS. 11A and 11B are diagrams illustrating operations of a base station and a terminal when the base station performs a signal transmission to the terminal by using a spatial multiplexing with two layers according to various embodiments of the present disclosure.

Referring to FIG. 11A, operations of the base station are illustrated using different precoders that are applied to DMRS and PCRS. At operation 1100, the base station transmits, to the terminal, DCI including the following information. The DCI is for transmission using a spatial multiplexing and includes two antenna ports ($p_1$, $p_2$ in case of DMRS, $q_1$, $q_2$ in case of PCRS) of each of DMRS and PCRS allocated to the terminal, and information indicating whether the same precoding is applied to both reference signals, DMRS and PCRS. In this case, the same precoding is not applied to both DMRS and PCRS.

Thereafter, the base station transmits downlink data to the terminal. At this time, the base station performs scrambling 1105 and modulation mapping 1110 for each of two codewords, performs layer mapping 1115 of a modulated symbol to each of two layers, performs RE mapping 1120 of the layer-mapped symbol associated with each of two antenna ports, and generates an OFDM signal 1125 from the symbol. In this case, the base station transmits data by applying different precodings 1130 to DMRS and PCRS and using a plurality of physical antennas (e.g., W is applied to DMRS and Z is applied to PCRS). At this time, the base station transmits DMRS and PCRS together with the data, and both reference signals are transmitted using two antenna ports indicated by the DCI.

Referring to FIG. 11B, operations of the terminal are illustrated. At operation 1150, the terminal receives a signal (data) from the base station and extracts, at operation 1155, information on a transmission method, DMRS and PCRS antenna ports, and information indicating whether the same precoding is applied, based on the DCI. Then, the terminal estimates channel information based on the DMRS port $p_1$ at operation 1160, and also estimates PN information based on the PCRS port $q_1$ at operation 1165. At this time, the terminal processes the PCRS by not assuming that the same precoding is applied to both DMRS and PCRS. In addition, the terminal estimates channel information based on the DMRS port $p_2$ at operation 1170, and also estimates phase noise information based on the PCRS port $q_2$ at operation 1175. At this time, the terminal processes the PCRS by not assuming that the same precoding is applied to both DMRS and PCRS. Then, the terminal performs phase noise compensation based on the channel information estimated based on the DMRS port $p_1$ and the phase noise information estimated based on the PCRS port $q_1$ at operation 1180, performs phase noise compensation based on the channel information estimated based on the DMRS port $p_2$ and the phase noise information estimated based on the PCRS port $q_2$ at operation 1185, and performs a symbol detection and channel decoding based on channel information with the compensated phase noise at operation 1190.

Figure 12A:
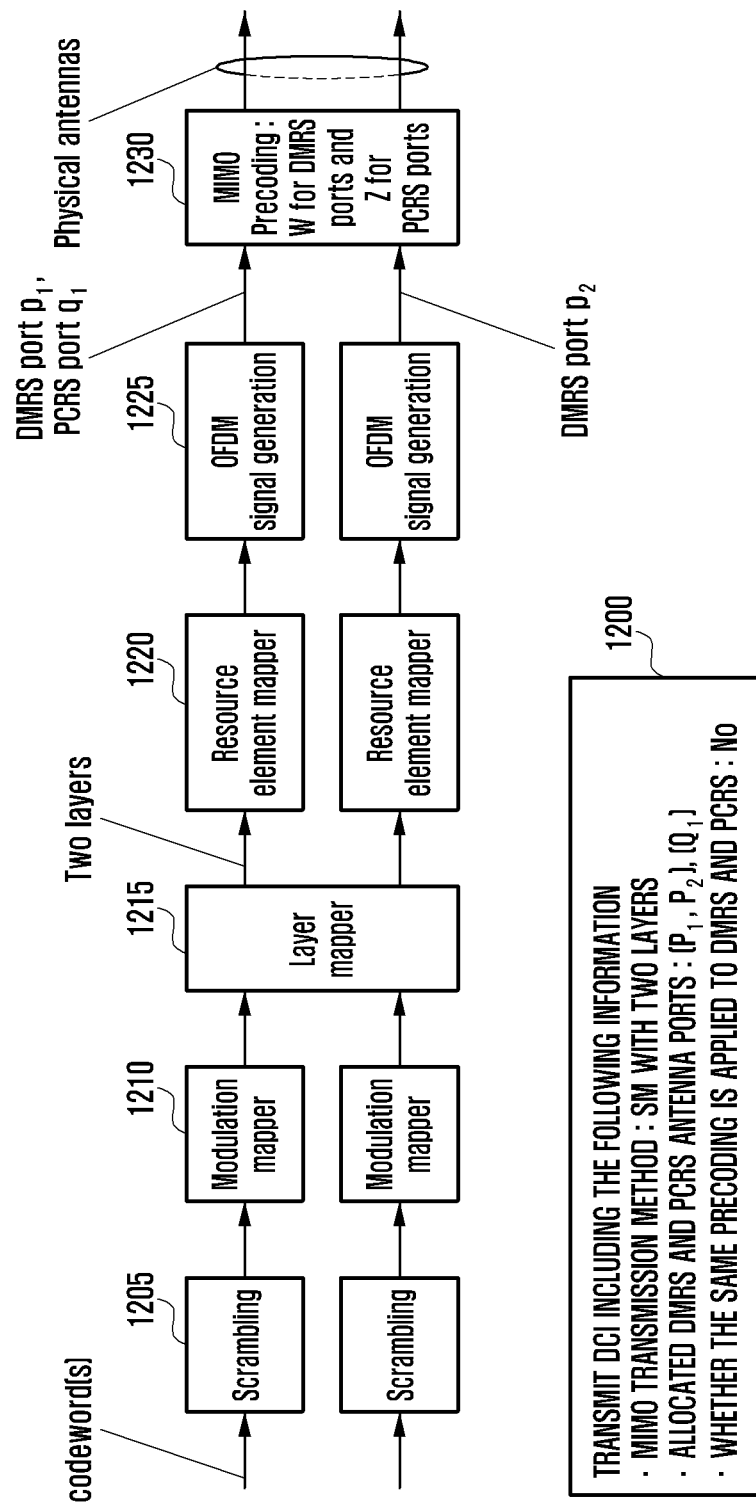
FIGS. 12A and 12B are diagrams illustrating operations of a base station and a terminal when the base station performs a signal transmission to the terminal by using a spatial multiplexing with two layers according to various embodiments of the present disclosure.
Figure 12B:
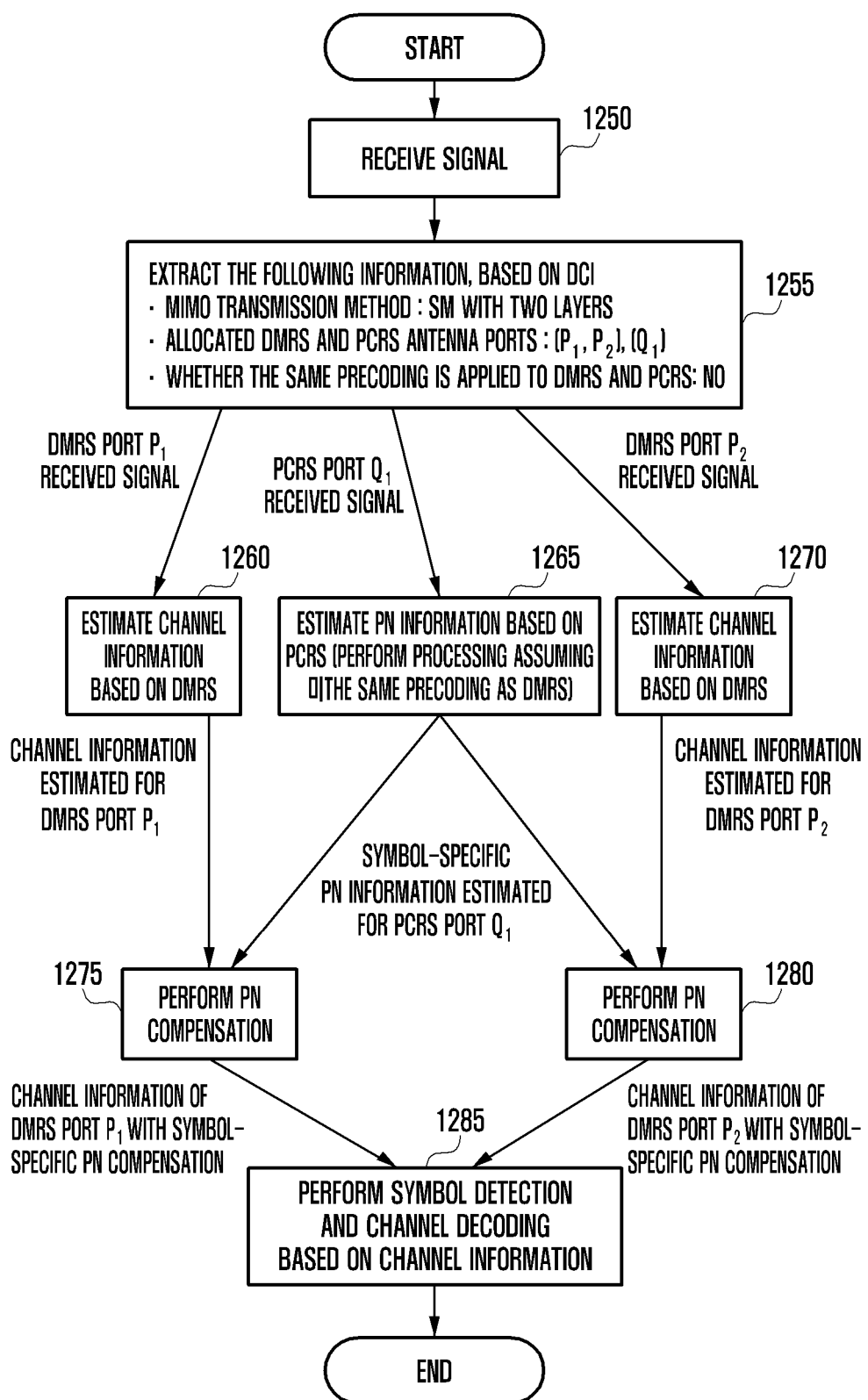

FIGS. 12A and 12B are diagrams illustrating operations of a base station and a terminal when the base station performs a signal transmission to the terminal by using a spatial multiplexing with two layers according to various embodiments of the present disclosure.

Referring to FIG. 12A, operations of the base station are illustrated having two DMRS ports and one PCRS port allocated and different precoders are used for DMRS and PCRS. At operation 1200, the base station transmits, to the terminal, DCI including the following information. The DCI is for transmission using a spatial multiplexing and includes DMRS and PCRS antenna ports ($p_1$, $p_2$ in case of DMRS, $q_1$ in case of PCRS) allocated to the terminal, and information indicating whether the same precoding is applied to both reference signals, DMRS and PCRS. In this case, the same precoding is not applied to DMRS and PCRS.

Thereafter, the base station transmits downlink data to the terminal. At this time, the base station performs scrambling 1205 and modulation mapping 1210 for each of two codewords, performs mapping layer 1215 of a modulated symbol to each of two layers, performs RE mapping 1220 of the layer-mapped symbol associated with each antenna port, generates an OFDM signal 1225 from the symbol, and applies different precodings 1230 to DMRS and PCRS (e.g., W for DMRS and Z for PCRS), and transmits using a plurality of physical antennas. At this time, the base station transmits DMRS and PCRS together with the data. At this time, one layer is transmitted together with the DMRS port $p_1$, and the other layer is transmitted together with the DMRS port $p_2$.

Referring to FIG. 12B, operations of the terminal are illustrated. At operation 1250, the terminal receives a signal (data) from the base station and extracts, at operation 1255, information on a transmission method, DMRS and PCRS antenna ports, and information indicating whether the same precoding is applied, based on the DCI. Then, the terminal estimates channel information based on the DMRS port $p_1$ at operation 1260, and also estimates PN information based on the PCRS port $q_1$ at operation 1265. At this time, the terminal processes the PCRS by not assuming that the same precoding is applied to both DMRS and PCRS. In addition, the terminal estimates channel information based on the DMRS port $p_2$ at operation 1270. Then, the terminal performs phase noise compensation based on the channel information estimated based on the DMRS port $p_1$ and the phase noise information estimated based on the PCRS port $q_1$ at operation 1275, performs phase noise compensation based on the channel information estimated based on the DMRS port $p_2$ and the phase noise information estimated based on the PCRS port $q_1$ at operation 1280, and performs a symbol detection and channel decoding based on channel information with the compensated phase noise at operation 1285. The operations 1265, 1275 and 1280 may be performed based on the methods discussed above in an embodiment.

Now, a structure and operation of a channel estimation block (or referred to as a channel estimator) of a terminal will be described.

Figure 13:
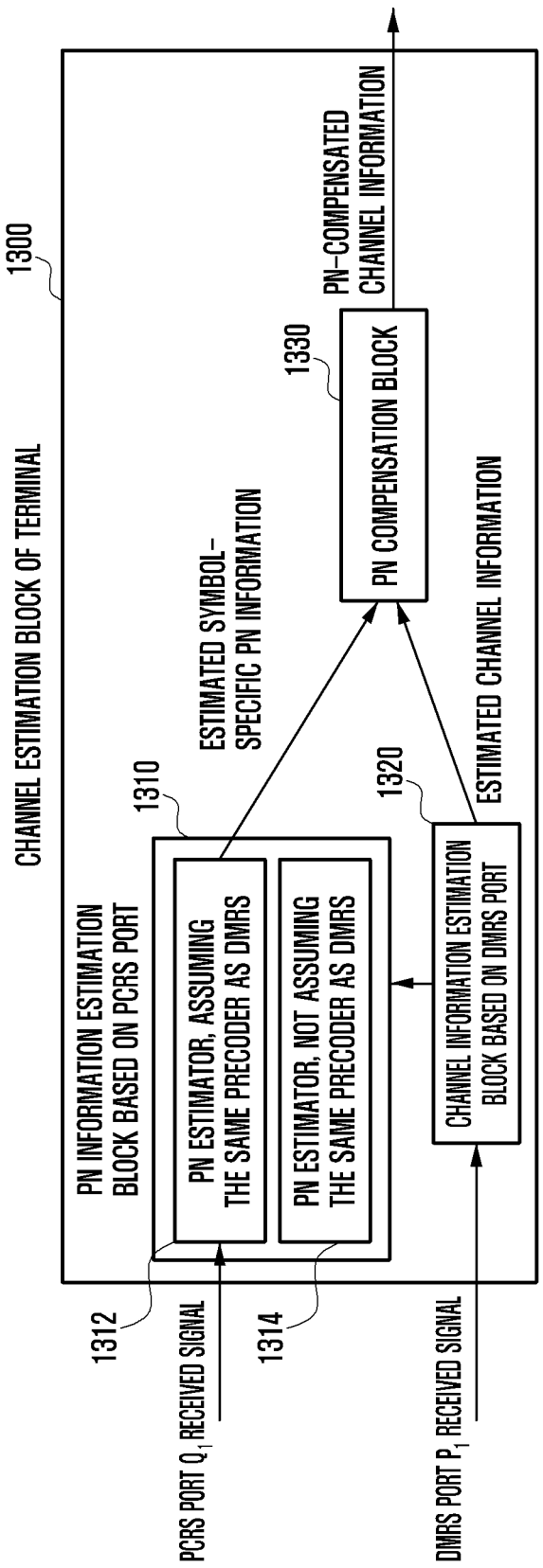
FIG. 13 is a diagram illustrating a structure and operation of a channel estimation block of a terminal when the same precoder is used for a DMRS and a PCRS according to various embodiments of the present disclosure.

FIG. 13 is a diagram illustrating a structure and operation of a channel estimation block of a terminal when the same precoder is used for a DMRS and a PCRS according to an embedment of the present disclosure.

Referring to FIG. 13, the channel estimation block 1300 includes a PN information estimation block 1310, a channel information estimation block 1320, and a PN compensation block 1330. The PN information estimation block 1310 estimates PN based on PCRS, and is formed of a PN estimator 1312 to be used in case of assuming the same precoder and a PN estimator 1314 to be used in case of not assuming the same precoder. In case of FIG. 13 in which the same precoder is used, a received PCRS is inputted to the PN estimator 1312. PN information estimated by the PN estimator 1312 is inputted to the PN compensation block 1330 together with channel information estimated by the channel information estimation block 1320 based on a received DMRS. Then the PN compensation block 1330 calculates and outputs channel information with compensated PN. The PN information estimated by the PN estimator 1312 may be as shown in Equation 3. The channel information with compensated PN may be as shown in Equation 2.

Figure 14A:
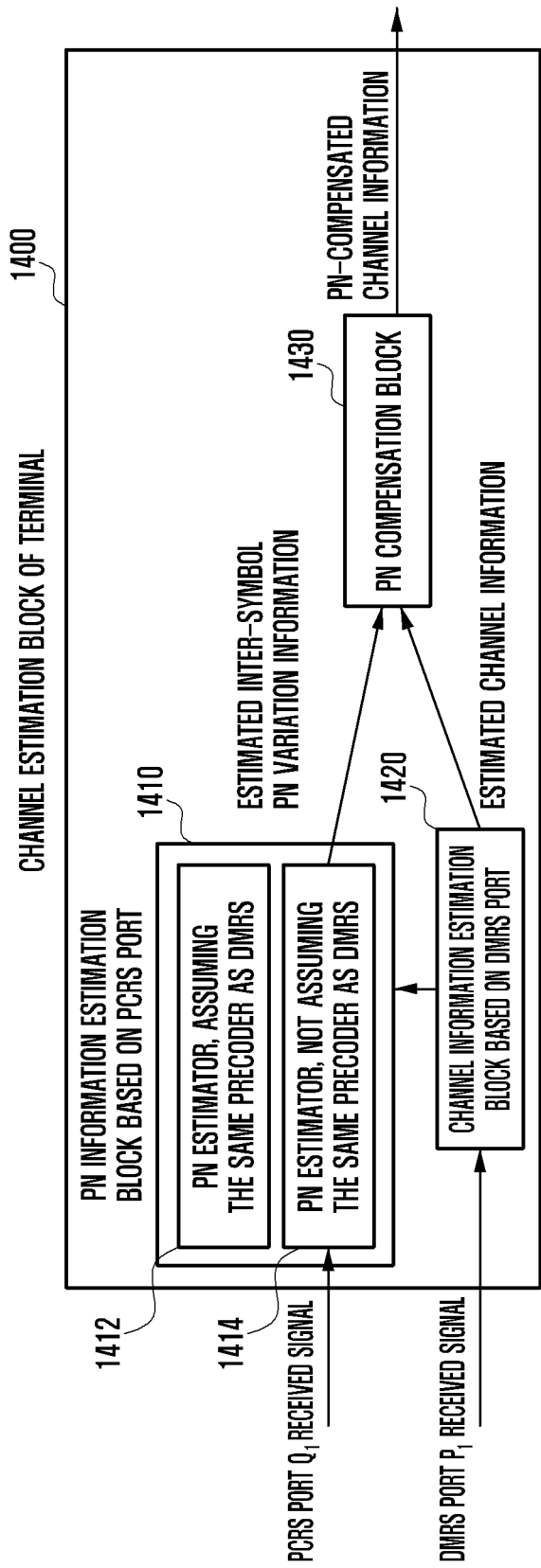
FIGS. 14A and 14B are diagrams illustrating a structure and operation of a channel estimation block of a terminal when the same precoder is not used for a DMRS and a PCRS according to various embodiments of the present disclosure.
Figure 14B:
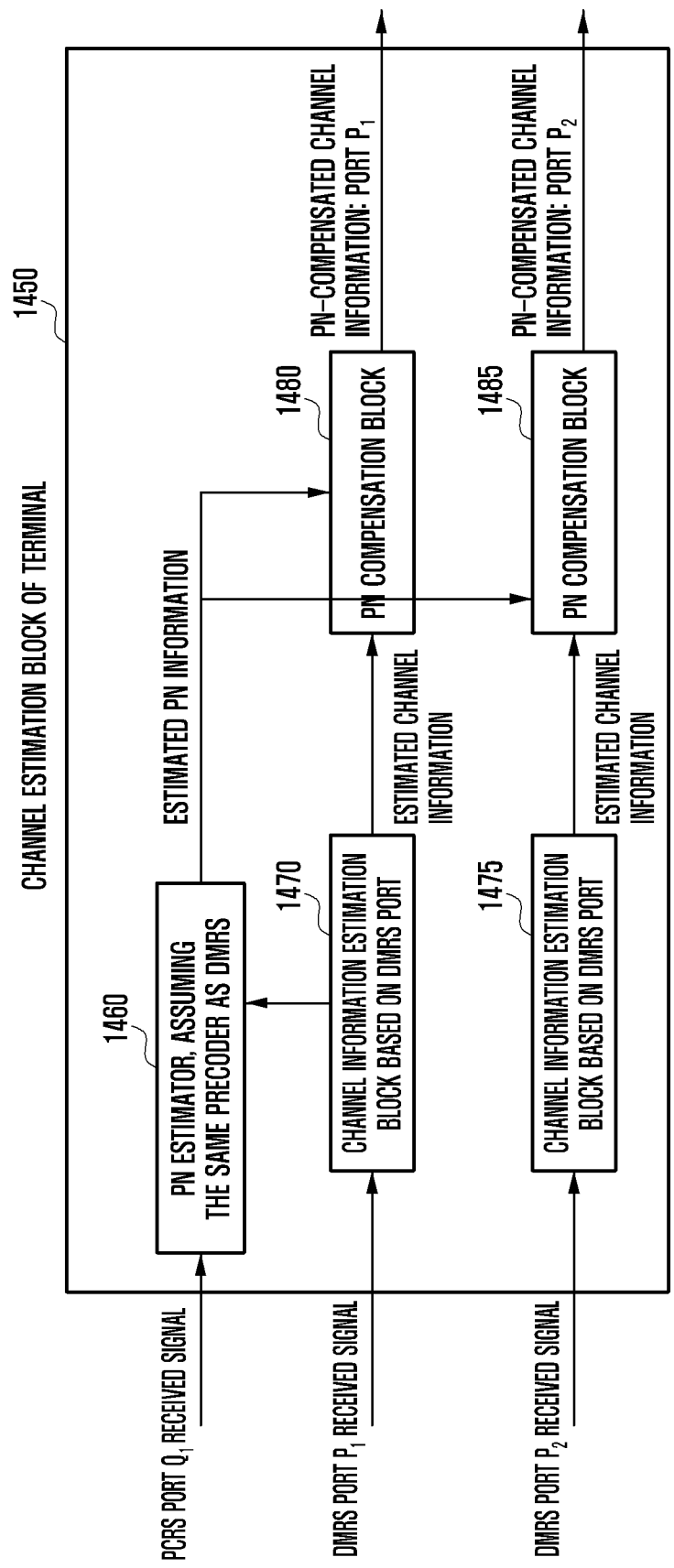

FIGS. 14A and 14B are diagrams illustrating a structure and operation of a channel estimation block of a terminal when the same precoder is not used for a DMRS and a PCRS according to various embodiments of the present disclosure.

Referring to FIG. 14A, the channel estimation block 1400 includes a PN information estimation block 1410, a channel information estimation block 1420, and a PN compensation block 1430. The PN information estimation block 1410 estimates PN based on PCRS, and is formed of a PN estimator 1412 to be used in case of assuming the same precoder and a PN estimator 1414 to be used in case of not assuming the same precoder. In case of FIG. 14A in which the same precoder is not used, a received PCRS is inputted to the PN estimator 1414. PN information estimated by the PN estimator 1414 is inputted to the PN compensation block 1430 together with channel information estimated by the channel information estimation block 1420 based on a received DMRS. Then the PN compensation block 1430 calculates and outputs channel information with compensated PN. The PN information estimated by the PN estimator 1414 may be as shown in Equation 4. The channel information with compensated PN may be as shown in Equation 5.

Referring to FIG. 14B, a structure and operation of a channel estimation block of a terminal are illustrated when two DMRS ports $p_1$, $p_2$ and one PCRS port $q_1$ are allocated and the same precoder is used for the DMRS port $p_1$ and the PCRS port $q_1$. The channel estimation block 1450 includes a PN estimator 1460, channel information estimation blocks 1470 and 1475, and PN compensation blocks 1480 and 1485. PN information estimated by the PN estimator 1460 is inputted to the PN compensation blocks 1480 and 1485 together with channel information estimated by the channel information estimation blocks 1470 and 1475 based on a received DMRS. Then each of the PN compensation blocks 1480 and 1485 calculates and outputs channel information with compensated PN. The PN information estimated by the PN estimator 1460 may be as shown in Equation 8. The channel information corresponding to the DMRS ports $p_1$ with compensated PN may be as shown in Equation 7, and the channel information corresponding to the DMRS ports $p_2$ with compensated PN may be as shown in Equation 9.

Figure 15:
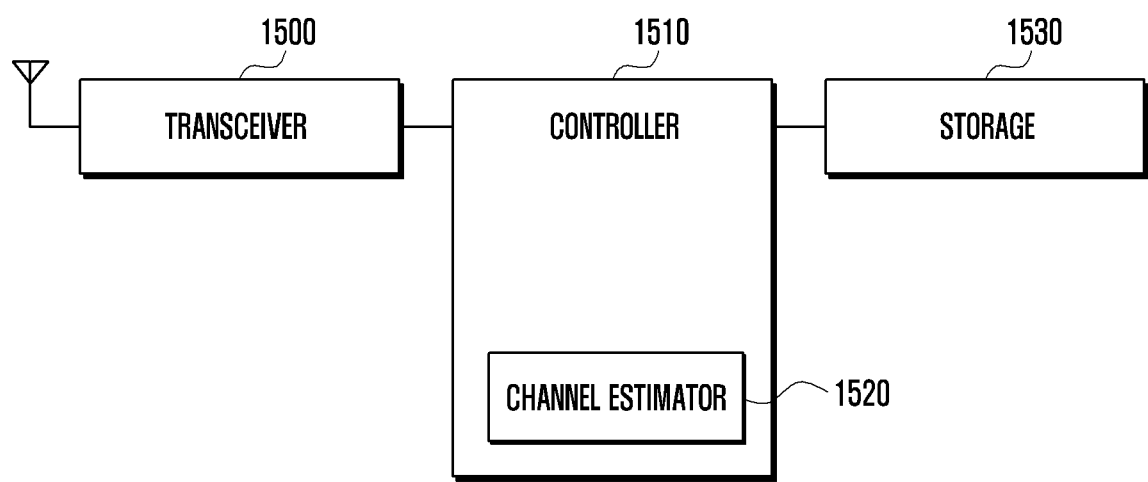
FIG. 15 is a diagram illustrating a structure of a terminal according to an embodiment of the present disclosure.

FIG. 15 is a diagram illustrating a structure of a terminal according to an embodiment of the present disclosure.

Referring to FIG. 15, the terminal may include a transceiver 1500, a controller 1510, and a storage 1530. In the present disclosure, the controller 1510 may be defined as a circuit, an application-specific integrated circuit, or at least one processor.

The transceiver 1500 may transmit and receive signals to and from the base station. For example, the transceiver 1500 may receive system information from the base station and may receive a synchronization signal or a reference signal. In particular, the transceiver 1500 may receive DCI, DMRS, and PCRS according to embodiments of the present disclosure.

The controller 1510 may control the overall operation of the terminal according to embodiments of the present disclosure. For example, the controller 1510 may control a signal flow between blocks to perform the above-discussed operations as shown in flow diagrams. Also, the controller 1510 includes a channel estimator 1520, which may be the channel estimation block as shown in FIGS. 13, 14A and 14B. The channel estimator 1520 may generate channel information from which a phase noise is compensated based on DMRS and PCRS. A method for generating the channel information is as described above in various embodiment of the present disclosure. This method or related process may be performed by the controller 1510.

The storage 1530 may store at least one of information transmitted/received through the transceiver 1500 and information generated through the controller 1510. For example, the storage 1530 may store the estimated channel information.

Figure 16:
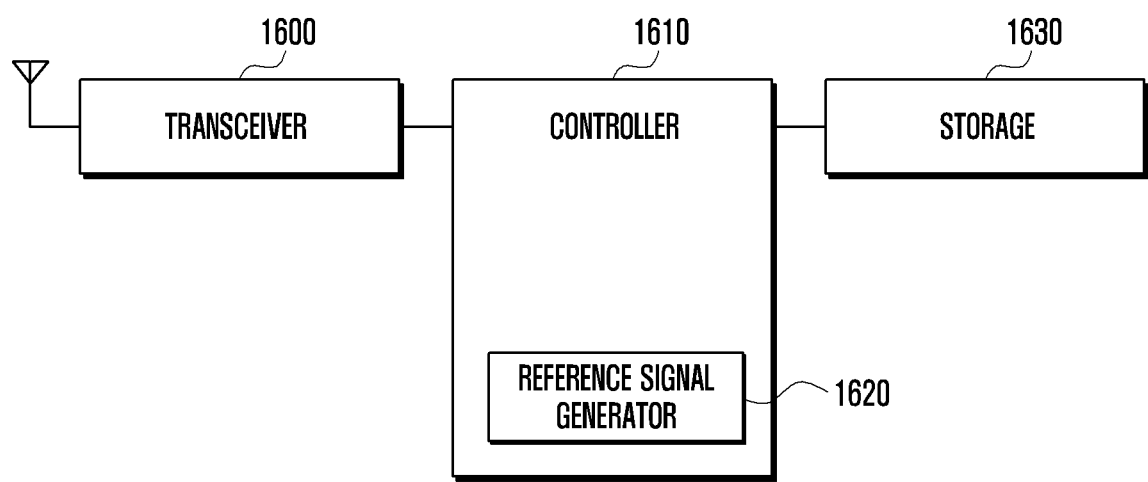
FIG. 16 is a diagram illustrating a structure of a base station according to an embodiment of the present disclosure.

FIG. 16 is a diagram illustrating a structure of a base station according to an embodiment of the present disclosure.

Referring to FIG. 16, the base station may include a transceiver 1600, a controller 1610, and a storage 1630. In the present disclosure, the controller 1610 may be defined as a circuit, an application-specific integrated circuit, or at least one processor.

The transceiver 1600 may transmit and receive signals to and from the terminal and any other network entity. For example, the transceiver 1600 may transmit system information to the terminal and may transmit a synchronization signal or a reference signal. In particular, the transceiver 1600 may transmit DCI, DMRS, and PCRS according to embodiments of the present disclosure.

The controller 1610 may control the overall operation of the base station according to embodiments of the present disclosure. For example, the controller 1610 may control a signal flow between blocks to perform the above-discussed operations as shown in flow diagrams. Also, the controller 1610 includes a reference signal generator 1620, which may generate PCRS and DMRS depending on whether the same precoding is applied, and then send the PCRS and DMRS to the terminal through the transceiver 1600. This process may be performed by the controller 1610.

The storage 1630 may store at least one of information transmitted/received through the transceiver 1600 and information generated through the controller 1610.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a base station in a wireless communication system, the method comprising:
   transmitting, to a terminal, a radio resource control (RRC) message including information configuring an association between a downlink phase related reference signal and a downlink demodulation reference signal (DMRS);
   transmitting, to the terminal, first downlink control information (DCI) associated with downlink transmission, the first DCI including information indicating at least one downlink DMRS antenna port;
   identifying a downlink phase related reference signal antenna port based on the DCI, the downlink phase related reference signal antenna port being associated with one of the at least one downlink DMRS antenna port indicated by the DCI; and
   transmitting, to the terminal, the downlink DMRS based on the at least one downlink DMRS antenna port and the downlink phase related reference signal based on the downlink phase related reference signal antenna port,
   wherein the downlink phase related reference signal is mapped on at least one resource element (RE) identified based on the information included in the RRC message and the DCI.

2. The method of claim 1,
wherein the downlink DMRS is used to estimate channel information, and
wherein the downlink phase related reference signal is used to estimate a phase noise for compensating the channel information.

3. A method performed by a terminal in a wireless communication system, the method comprising:
receiving, from a base station, a radio resource control (RRC) message including information configuring an association between a downlink phase related reference signal and a downlink demodulation reference signal (DMRS);
receiving, from the base station, downlink control information (DCI) associated with downlink transmission, the DCI including information indicating at least one downlink DMRS antenna port;
identifying a downlink phase related reference signal antenna port based on the DCI, the downlink phase related reference signal antenna port being associated with one of the at least one downlink DMRS antenna port indicated by the DCI; and
receiving, from the base station, the downlink DMRS based on the at least one downlink DMRS antenna port and the downlink phase related reference signal based on the downlink phase related reference signal antenna port,
wherein the downlink phase related reference signal is mapped on at least one resource element (RE) identified based on the information included in the RRC message and the DCI.

4. The method of claim 3,
wherein the downlink DMRS is used to estimate channel information, and
wherein the downlink phase related reference signal is used to estimate a phase noise for compensating the channel information.

5. A base station in a wireless communication system, the base station comprising:
a transceiver configured to transmit and receive a signal; and
a controller configured to:
transmit, to a terminal, a radio resource control (RRC) message including information configuring an association between a downlink phase related reference signal and a downlink demodulation reference signal (DMRS),
transmit, to the terminal, downlink control information (DCI) associated with downlink transmission, the DCI including information indicating at least one downlink DMRS antenna port,
identify a downlink phase related reference signal antenna port based on the DCI, the downlink phase related reference signal antenna port being associated with one of the at least one downlink DMRS antenna port indicated by the DCI, and
transmit, to the terminal, the downlink DMRS based on the at least one downlink DMRS antenna port and the downlink phase related reference signal based on the downlink phase related reference signal antenna port,
wherein the downlink phase related reference signal is mapped on at least one resource element (RE) identified based on the information included in the RRC message and the DCI.

6. The base station of claim 5,
wherein the downlink DMRS is used to estimate channel information, and
wherein the downlink phase related reference signal is used to estimate a phase noise for compensating the channel information.

7. A terminal in a wireless communication system, the terminal comprising:
a transceiver configured to transmit and receive a signal; and
a controller configured to:
receive, from a base station, a radio resource control (RRC) message including information configuring an association between a downlink phase related reference signal and a downlink demodulation reference signal (DMRS),
receive, from the base station, downlink control information (DCI) associated with downlink transmission, the DCI including information indicating at least one downlink DMRS antenna port,
identify a downlink phase related reference signal antenna port based on the DCI, the downlink phase related reference signal antenna port being associated with one of the at least one downlink DMRS antenna port indicated by the DCI, and
receive, from the base station, the downlink DMRS based on the at least one downlink DMRS antenna port and the downlink phase related reference signal based on the downlink phase related reference signal antenna port,
wherein the downlink phase related reference signal is mapped on at least one resource element (RE) identified based on the information included in the RRC message and the DCI.

8. The terminal of claim 7,
wherein the downlink DMRS is used to estimate channel information, and
wherein the downlink phase related reference signal is used to estimate a phase noise for compensating the channel information.

* * * * *